United States Patent
Masaki et al.

(10) Patent No.: US 8,009,206 B2
(45) Date of Patent: Aug. 30, 2011

(54) ADAPTIVE SENSITIVITY CONTROL, ON A PIXEL-BY-PIXEL BASIS, FOR A DIGITAL IMAGER

(75) Inventors: Ichiro Masaki, Boxborough, MA (US); Lane Gearle Brooks, Somerville, MA (US); Vivek A. Sikri, Medford, MA (US); Keith Glen Fife, Cambridge, MA (US)

(73) Assignee: Melexis Tessenderlo NV, Tessenderlo (BE)

(*) Notice: Subject to any disclaimer, the term of this patent is extended or adjusted under 35 U.S.C. 154(b) by 2710 days.

(21) Appl. No.: 10/037,885

(22) Filed: Jan. 4, 2002

(65) Prior Publication Data

US 2002/0105581 A1    Aug. 8, 2002

Related U.S. Application Data

(60) Provisional application No. 60/261,023, filed on Jan. 11, 2001.

(51) Int. Cl.
    *H04N 5/217* (2011.01)
(52) U.S. Cl. .............. 348/241; 348/243; 348/222.1; 348/223.1; 348/224.1; 348/227.1
(58) Field of Classification Search .......... 348/241, 348/243, 222.1–229.1, 362, 363
    See application file for complete search history.

(56) References Cited

U.S. PATENT DOCUMENTS

| | | | |
|---|---|---|---|
| 6,040,570 A | | 3/2000 | Levine et al. |
| 6,101,294 A | * | 8/2000 | McCaffrey et al. ............ 382/312 |
| 6,348,681 B1 | * | 2/2002 | Kindt et al. ................ 250/208.1 |
| 6,417,867 B1 | | 7/2002 | Hallberg |
| 6,421,459 B1 | | 7/2002 | Rowe |
| 6,765,611 B1 | * | 7/2004 | Gallagher et al. ......... 348/222.1 |
| 6,816,200 B1 | * | 11/2004 | Gough .......................... 348/362 |

(Continued)

FOREIGN PATENT DOCUMENTS

DE    197 40 910    3/1999

(Continued)

OTHER PUBLICATIONS

"A Stereo Vision System with Automatic Brightness Adaption," Keith G. Fife. *Massachusetts Institute of Technology*. May 1999. p. 1-141.

(Continued)

*Primary Examiner* — Yogesh K Aggarwal
(74) *Attorney, Agent, or Firm* — Gesmer Updegrove LLP

(57) ABSTRACT

A system and method adaptively control sensitivity, on a pixel-by-pixel basis, of a digital imager. An illumination intensity level mapping controller determines a number of pixels of image data having illumination intensity levels within a first defined range of illumination intensity levels and determines an illumination intensity level mapping function based upon the determined number of pixels within the first defined range of illumination intensity levels. An exposure controller determines a number of pixels having illumination intensity levels within a second defined range of illumination intensity levels and determines an integration time based upon the determined number of pixels having illumination intensity levels within the second defined range of illumination intensity levels. A transfer control function generation circuit determines a composite transfer control function based on the determined integration time and determined illumination intensity level mapping function; determines each transition point between a plurality of discrete transfer control functions from the determined integration time and the determined illumination intensity level mapping function; and imposes the determined transfer control function upon a pixel of the digital imager.

99 Claims, 10 Drawing Sheets

U.S. PATENT DOCUMENTS 6,906,745 B1 * 6/2005 Fossum et al. ............. 348/229.1

FOREIGN PATENT DOCUMENTS

| EP | 1 119 188 | 7/2001 |
|---|---|---|
| WO | WO 99/66560 | 12/1999 |
| WO | WO 02/11426 | 2/2002 |

OTHER PUBLICATIONS

"SMaL Camera Technologies Introduces Its Super Thin "Ultra-Pocket" Digital Camera Featuring Autobrite™ Technology", SMaL Camera Technologies, Inc., Press Release, DES 2001, Booth #4346, Digital Imaging Pavilion.

"See What You've Been Missing", SMaL Camera Technologies, Inc., Brochure, 7 pages.

"SMaL Camera Technologies Introduces Its CMOS VGA Imager Featuring Autobrite™ Technology and the Industry's Lowest Power Consumption", SMaL Camera Technologies, Inc., Press Release, CES 2001, Booth #4346, Digital Imaging Pavilion, 1 page.

"About SMaL Camera Technologies, Inc.", SMaL Camera Technologies, 2001, 1 page.

"SMaL Camera Technologies Introduces Its Wide Dynamic Range Digital Video Camera Featuring Autobrite™ Technology", SMaL Camera Technologies, Inc., Press Release, CES 2001, Booth #4346, Digital Imaging Pavilion, 1 page.

* cited by examiner

ADAPTIVE SENSITIVITY CONTROL, ON A PIXEL-BY-PIXEL BASIS, FOR A DIGITAL IMAGER

PRIORITY INFORMATION

This application claims priority from U.S. Provisional Patent Application Ser. No. 60/261,023, filed on Jan. 11, 2001; the entire contents of which are hereby incorporated by reference.

FIELD OF THE PRESENT INVENTION

The present invention is directed to controlling sensitivity, on a pixel-by-pixel basis, of a digital imager. More specifically, the present invention is directed to adaptively controlling sensitivity, on a pixel-by-pixel basis, of a digital imager to expand a dynamic range of the digital imager.

BACKGROUND OF THE PRESENT INVENTION

Conventionally, digital imagers, as noted above, are characterized by a linear voltage-to-light response, or transfer function; that is, the digital imager output voltage is approximately linearly related to light incident on the digital imager. Specifically, the output voltage transfer function is linearly proportional to the intensity of the light incident upon the digital imager. This linear transfer function can be characterized by a dynamic range. The dynamic range is defined as the difference between the highest detectable illumination intensity of a scene to the lowest detectable illumination intensity of the scene. It is well understood that the dynamic range of the transfer function sets the overall dynamic range of the digital imager. If the dynamic range of a scene exceeds the dynamic range of a digital imager, portions of the scene will saturate the digital imager and appear either completely black or completely white. This can be problematic for imaging large dynamic range scenes, such as outdoor scenes.

A conventional digital imager includes a plurality of photosensitive elements commonly referred to as pixels. The physical realization of the pixels is either a plurality of phototransistors or a plurality of photodiodes functioning as light-detecting elements. In operation, the pixel is first reset with a reset voltage that places an electronic charge across the capacitance associated with the diode. Electronic charge produced by, for example, a photodiode, when exposed to illumination, causes charge of the diode capacitance to dissipate in proportion to the incident illumination intensity of the scene. At the end of an exposure period, the change in diode capacitance charge is detected and the photodiode is reset. The amount of light detected by the photodiode is computed as the difference between the reset voltage and the voltage corresponding to the final diode capacitance charge.

The sensitivity of a digital imager, such as that provided in a digital still or video camera, can in general be defined by the maximum and minimum light intensities of a scene that can be imaged by the digital imager. The light or illumination intensity of a scene captured by a pixel of a digital imager is a value related to an output voltage or amount of charge measured at the pixel, photosensitive element.

There are various situations that can limit the sensitivity of a digital imager. One example is pixel saturation. Pixel saturation is realized when a photosensitive element, pixel, becomes depleted of charge such that no amount of additional incident light will change the output voltage, thus pixel saturation acts to limit the maximum light intensity of the scene that can be discretely imaged. In other words, if the saturation of a pixel is an illumination intensity level of 100, all illumination intensity levels of the scene that are above an illumination intensity level of 100 are represented as an illumination intensity level of 100 in the imaged scene, and thus, these illumination intensity levels of the scene that are above an illumination intensity level of 100 are not discretely imaged or are not discernible because notwithstanding the actual illumination intensity level, above 100, the imaged illumination intensity level is 100.

Another example is pixel noise. Examples of sources of pixel noise are quantization in the conversion of the analog voltage to a digital code, integrated thermal charge production, and voltage reset variation when a pixel is not sampled using a true correlated double sample. Pixel noise sets the minimum detectable illumination intensity. Since the human eye has a logarithmic response to intensity, in digital imaging, it is usually noise in the lower intensities that is of concern.

Both pixel saturation and pixel noise are inherent properties of a digital imager. So, these properties limit the physical sensitivity of a digital imager such that a scene, having a wide range of light (illumination) intensities, cannot be imaged properly; the higher light (illumination) intensities of the scene are washed out in the imaged scene due to pixel saturation, or the low light (illumination) intensities of the scene become less resolvable due to pixel noise.

Conventionally, methods have been proposed to nullify these physical limitations of a digital imager, such as the manipulation or adjustment of the charge integration function of the pixel, also known as the transfer control function of the digital imager. Charge integration function manipulation or transfer control function manipulation has, conventionally, been realized through the changing of an integration time, $T_{int}$, for the digital imager. Changing the integration time, $T_{int}$, changes the start time of the transfer control function or charge integration period. In other words, changing the integration time is a form of electronic-irising or exposure control, analogous to controlling the speed of a shutter on an analog camera. An example of conventional integration time manipulation is illustrated in FIGS. 1 and 2.

FIG. 1 shows a linear transfer control function wherein an integration time, $T_{int}$, is near a maximum integration time. Integration time, $T_{int}$, is the time that a control signal 10 is not set at a reset level. When the control signal 10 is not at a reset value during a frame period, F, the digital imager causes charge to be transferred or collected from a pixel. As shown in FIG. 1, the control signal 10 is initially at a reset level (at the beginning of the frame period, F); however, the control signal 10 changes to another level, in this case a collect level, at a point in time, within the frame period, that is equal to a difference between the frame period, F, and the integration time, $T_{int}$. (In FIG. 1, the difference is very small.) The control signal 10 changes back to the reset level at the end of the frame period, F.

On the other hand, FIG. 2 shows a linear transfer control function wherein the integration time, $T_{int}$, is decreased. As noted above, integration time, $T_{int}$, is the time that a control signal 10 is not set at a reset level. When the control signal 10 is not at a reset value during a frame period, F, the digital imager causes charge to be transferred or collected from a pixel. As shown in FIG. 2, the control signal 10 is initially at a reset level (at the beginning of the frame period, F); however, the control signal 10 changes to another level, in this case a collect level, at a point in time, within the frame period, that is equal to a difference between the frame period, F, and the integration time, $T_{int}$. (In FIG. 2, the difference is approximately equal to half the frame period, F.) The control signal 10 changes back to the reset level at the end of the frame period, F.

In other words, FIG. 2 shows a situation where the control signal 10 is set at a level that causes charge to be transferred or collected from the pixel for a shorter duration of time than shown in FIG. 1. By decreasing the integration time, the low illumination intensity levels of the scene being imaged are de-emphasized because not enough time is given to for the charge associated with the low illumination intensity levels of the scene to accumulate because the low illumination intensity level does produce charge as quickly as the high illumination intensity levels.

Another way of looking at the relationship of the integration time, $T_{int}$, of the digital imager to the illumination intensity level of the imaged scene is shown in FIG. 3. In FIG. 3, curve A represents a first mapping of pixel output voltage versus illumination intensity level of the imaged scene using a first integration time, $T1_{int}$. Curve B shows a second mapping of pixel output voltage versus illumination intensity level of the imaged scene using a second integration time, $T2_{int}$. In FIG. 3, the second integration time, $T2_{int}$, is smaller than the first integration time, $T1_{int}$. Thus, as illustrated in FIG. 3, as the integration time, $T1_{int}$, is increased, the slope of the map of pixel output voltage versus illumination intensity level of the imaged scene is increased, thereby emphasizing the lower illumination intensity levels of the imaged scene.

Another conventional way of manipulating the transfer control function is to use a stepped or piecewise discrete-time transfer control function. By using a stepped or piecewise discrete transfer control function, the mapping of the pixel output voltage versus illumination intensity level of the imaged scene can be modified to enable a wider range of possible illumination intensity levels of the imaged scene before saturation, while emphasizing low illumination intensity levels of the imaged scene.

An example of a conventional stepped or piecewise discrete-time transfer control function is illustrated in FIG. 4. In FIG. 4, the integration time, $T1_{int}$, is the same value as illustrated in FIG. 1. However, unlike FIG. 1, the level of the control signal 10, in FIG. 4, is stepped down in a discrete fashion from a reset level to a collect value. The control signal 10 acts as a barrier to charge production or accumulation. At the reset level, a complete barrier is realized wherein no charge is produced or accumulated, notwithstanding the illumination intensity level of the light incident upon the pixel. In other words, the pixel is effectively turned off. As the control signal 10, is stepped down from a reset level, the effective barrier is lower, thus allowing a rate of production or accumulation of charge to effectively realize a gradual increase.

Specifically, as illustrated in FIG. 4, over the course of an exposure period, the control signal 10 is applied to the pixel or photodiode capacitance to control charge dissipation from the capacitance. The control signal 10 is typically decreased from the starting pixel reset voltage value to, e.g., electrical ground or a collect level, with each control signal 10 value at a given time during the exposure period setting the maximum charge dissipation of the photodiode. This control signal 10 decrease acts to increase the photodiode charge dissipation capability, whereby the pixel can accommodate a higher illumination intensity before saturating, and the dynamic range of the pixel is thusly increased. This charge dissipation control produces a nonlinear pixel output voltage to imaged scene illumination intensity level mapping and a correspondingly expanded dynamic range of the pixel and the imager. This is seen in FIG. 5.

Using a step or piecewise discrete-time transfer control function, as illustrated in FIG. 4, a mapping of the pixel output voltage versus illumination intensity level of the imaged scene having a wider range, as illustrated in FIG. 5, is produced. In FIG. 5, curve A shows a mapping of the pixel output voltage versus illumination intensity level of the imaged scene when a linear control transfer function, as illustrated in FIG. 1, is used, whereas curve B shows a mapping of the pixel output voltage versus illumination intensity level of the imaged scene when a stepped or piecewise discrete-time transfer control function, as illustrated in FIG. 4, is used. As illustrated in FIG. 5, curve B has a wider range of illumination intensity levels of the imaged scene than curve A.

Although the physical limitations of digital imagers have been compensated for through integration time adjustment and transfer control function (resulting in the production of the control signal 10) manipulation, these conventional approaches still fail to compensate for the digital imager's physical limitations in an optimal way.

For example, the conventional processes fail to realize an illumination intensity level of the imaged scene range in which no saturated pixels exist. More specifically, as illustrated in FIG. 6, a histogram of actual illumination intensity levels of a scene to be imaged may include illumination intensity levels from 20 to 200 when the image average is 50; however, due to pixel saturation, illumination intensity levels of the scene above the 100 illumination intensity level will not be represented by the digital imager, as illustrated FIG. 7, because these higher illumination intensity levels of the scene are all bucketed at the 100 illumination intensity level by the digital imager due to pixel saturation, thereby washing out the higher illumination intensity levels of the imaged scene.

Using the conventional processes described above to compensate for the saturated pixels by reducing the integration time, a histogram of the illumination intensity levels of the imaged scene is realized as illustrated in FIG. 8. In FIG. 8, the histogram of the imaged scene is scaled by a factor of 0.5 such that the image illumination intensity average changes from 50 to 25. Using this conventional approach, a greater portion of the higher illumination intensity levels of the scene can be represented; however, the image is unacceptably dark, the quantization noise of the entire image has been cut in half, and the signal may also have been reduced by a factor of 2 while other noise sources stay fixed in magnitude (such as reset noise).

SUMMARY OF THE PRESENT INVENTION

A first aspect of the present invention is a method of adaptively controlling sensitivity, on a pixel-by-pixel basis, of a digital imager. The method determines a number of pixels of image data having illumination intensity levels within a first defined range of illumination intensity levels; determines an illumination intensity level mapping function based upon the determined number of pixels within the first defined range of illumination intensity levels; determines a transfer control function based on the determined illumination intensity level mapping function; and imposes the determined transfer control function upon a pixel of the digital imager.

A second aspect of the present invention is a method of adaptively controlling sensitivity, on a pixel-by-pixel basis, of a digital imager. The method determines a plurality of numbers of pixels, each determined number of pixels being a number of pixels within an associated defined range of illumination intensity levels; determines a plurality of illumination intensity level mapping functions, each determined illumination intensity level mapping function corresponding to one defined range of illumination intensity levels, each illumination intensity level mapping function being determined based upon the determined number of pixels within the corresponding defined range of illumination intensity levels; determines a transfer control function based on the plurality of determined illumination intensity level mapping functions; and imposes the determined transfer control function upon a pixel of the digital imager.

A third aspect of the present invention is a method of adaptively controlling sensitivity, on a pixel-by-pixel basis, of a digital imager. The method determines a number of saturated pixels; selects a first illumination intensity level mapping function when the determined number of saturated pixels is above a first threshold; determines an number of pixels having illumination intensity levels within a defined range of values; selects a second illumination intensity level mapping function when the determined number of pixels is below a second threshold; determines a transfer control function based on the selected illumination intensity level mapping function; and imposes the determined transfer control function upon a pixel of the digital imager.

A fourth aspect of the present invention is a method of adaptively controlling sensitivity, on a pixel-by-pixel basis, of a digital imager. The method determines a number of pixels of image data having illumination intensity levels within a first defined range of illumination intensity levels, the first defined range of illumination intensity levels including an illumination intensity level corresponding to a pixel saturation value; determines an illumination intensity level mapping function based upon the determined number of pixels within the first defined range of illumination intensity levels; determines a number of pixels having illumination intensity levels within a second defined range of illumination intensity levels, the second defined range of illumination intensity levels including an illumination intensity level corresponding to a minimum illumination intensity level; determines an integration time based upon the determined number of pixels having illumination intensity levels within the second defined range of illumination intensity levels; determines a transfer control function based on the determined illumination intensity level mapping function and the determined integration time; and imposes the determined transfer control function upon a pixel of the digital imager.

A fifth aspect of the present invention is a method of adaptively controlling sensitivity, on a pixel-by-pixel basis, of a digital imager. The method selects a first illumination intensity level mapping function; determines a first transfer control function based on the selected first compression; imposes the determined first transfer control function upon a pixel of the digital imager; determines a histogram of illumination intensity levels of pixels of image data being generated by the digital imager having the determined first transfer control function imposed thereon; determines an illumination intensity level maximum, the illumination intensity level maximum representing a greatest illumination intensity level for a pixel in a sample forming the histogram; determines a second illumination intensity level mapping function, based on the determined intensity level maximum, the second illumination intensity level mapping function preventing the generation of any saturated pixels and providing a dynamic range of image data enabling each level in the histogram to be realized by the digital imager; determines a second transfer control function based on the determined second illumination intensity level mapping function; and imposes the determined second transfer control function upon a pixel of the digital imager.

A sixth aspect of the present invention is a method for determining transition points between a plurality of discrete transfer control functions forming a composite transfer control function. The method determines an integration time; determines an illumination intensity level mapping function; determines a composite transfer control function based on the determined integration time and determined illumination intensity level mapping function; and determines a timing of each transition point between a plurality of discrete transfer control functions from the determined integration time and the determined illumination intensity level mapping function.

A seventh aspect of the present invention is a system for adaptively controlling sensitivity, on a pixel-by-pixel basis, of a digital imager. The system includes an illumination intensity level mapping controller to determine a number of pixels of image data having illumination intensity levels within a first defined range of illumination intensity levels and to determine an illumination intensity level mapping function based upon the determined number of pixels within the first defined range of illumination intensity levels and a transfer control function generation circuit to determine a transfer control function based on the determined illumination intensity level mapping function and to impose the determined transfer control function upon a pixel of the digital imager.

An eighth aspect of the present invention is a system for adaptively controlling sensitivity, on a pixel-by-pixel basis, of a digital imager. The system includes an illumination intensity level mapping controller to determine a plurality of number of pixels, each determined number of pixels corresponding to one defined range of illumination intensity levels, and to determine a plurality of illumination intensity level mapping functions, each determined illumination intensity level mapping function corresponding to one defined range of illumination intensity levels, each illumination intensity level mapping function being determined based upon the determined number of pixels within the corresponding defined range of illumination intensity levels and a transfer control function generation circuit to determine a transfer control function based on the plurality of determined illumination intensity level mapping functions and to impose the determined transfer control function upon a pixel of the digital imager.

A ninth aspect of the present invention is a system for adaptively controlling sensitivity, on a pixel-by-pixel basis, of a digital imager. The system includes an illumination intensity level mapping controller to determine a number of saturated pixels and to select a first illumination intensity level mapping function when the determined number of saturated pixels is above a first threshold. The illumination intensity level mapping controller determines a number of pixels having illumination intensity levels within a defined range of values and selects a second illumination intensity level mapping function when the determined number of pixels is below a second threshold. The system further includes a transfer control function generation circuit to determine a transfer control function based on the selected illumination intensity level mapping function and to impose the determined transfer control function upon a pixel of the digital imager.

A tenth aspect of the present invention is a system for adaptively controlling sensitivity, on a pixel-by-pixel basis, of a digital imager. The system includes an illumination intensity level mapping controller to determine a number of pixels of image data having illumination intensity levels within a first defined range of illumination intensity levels, the first defined range of illumination intensity levels including an illumination intensity level corresponding to a pixel saturation value, and to determine an illumination intensity level mapping function based upon the determined number of pixels within the first defined range of illumination intensity levels; an exposure controller to determine a number of pixels having illumination intensity levels within a second defined range of illumination intensity levels, the second defined range of illumination intensity levels including an illumination intensity level corresponding to a minimum illumination intensity level, and to determine an integration time based upon the determined number of pixels having illumination intensity levels within the second defined range of illumination intensity levels; and a transfer control function generation circuit to determine a transfer control function based on the determined illumination intensity level mapping function and the determined integration time and to impose the determined transfer control function upon a pixel of the digital imager.

An eleventh aspect of the present invention is a system for adaptively controlling sensitivity, on a pixel-by-pixel basis, of a digital imager. The system includes an illumination intensity level mapping controller to select a first illumination intensity level mapping function and a transfer control function generation circuit to determine a first transfer control function based on the selected first compression and to impose the determined first transfer control function upon a pixel of the digital imager. The illumination intensity level mapping controller determines a histogram of illumination intensity levels of pixels of image data being generated by the digital imager having the determined first transfer control function imposed thereon and determines an illumination intensity level maximum, the illumination intensity level maximum representing a greatest illumination intensity level for a pixel in a sample forming the histogram. The illumination intensity level mapping controller determines a second illumination intensity level mapping function, based on the determined intensity level maximum, the second illumination intensity level mapping function preventing the generation of any saturated pixels and providing a dynamic range of image data enabling each level in the histogram to be realized by the digital imager. The transfer control function generation circuit determines a second transfer control function based on the determined second illumination intensity level mapping function and imposes the determined second transfer control function upon a pixel of the digital imager.

A twelfth aspect of the present invention is for determining transition points between a plurality of discrete transfer control functions forming a composite transfer control function. The system includes an exposure controller to determine an integration time; an illumination intensity level mapping controller to determine an illumination intensity level mapping function; and a transfer control function generation circuit to determine a composite transfer control function based on the determined integration time and determined illumination intensity level mapping function and to determine a timing of each transition point between a plurality of discrete transfer control functions from the determined integration time and the determined illumination intensity level mapping function.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

It is desirable to increase the dynamic range of the digital imager such that the low illumination intensity levels of the scene are emphasized, but also the high illumination intensity levels of the scene are represented and no pixels become saturated during a given integration period. Moreover, it is desirable to utilize the entire dynamic range of the digital imager when imaging a scene, notwithstanding the actual range of illumination intensities of the scene.

The present invention provides techniques and systems for adjusting the sensitivity, on a pixel-by-pixel basis, of a digital imager by adjusting the transfer control function (resulting in the production of the control signal) through determining an illumination intensity level mapping function and an integration time characteristic of the digital imager in a manner that enables full use of the entire output intensity level range of the digital imager without saturation of the digital imager. These techniques can be applied to a wide range of digital still and video camera configurations.

In describing the present invention, various terms have been used. In this specification, a frame period is the time period needed to read all the pixels of a digital imager to produce one frame of an imaged scene. Integration time refers to the time period, within an overall frame period, that a digital imager is receiving incident light or illumination from a scene being imaged and producing a collectable charge or voltage in response to incident light or illumination of the scene being imaged. Illumination intensity level mapping function refers to the analog to digital conversion relationship between an analog signal received from a pixel of the digital imager and a digital signal representing the illumination intensity received by the pixel. Output voltage versus illumination intensity level map is a graphical representation of the illumination intensity level mapping function. Transfer control function refers to the controlling of the charge dissipation from the pixel of the digital imager during the integration time period through timing manipulation and control signal voltage level or value manipulation. Transfer control function generation refers to either the actual generation of the control signal that controls the charge dissipation from the pixel of the digital imager or a signal that is used to generate the control signal that controls the charge dissipation from the pixel of the digital imager.

Figure 1:
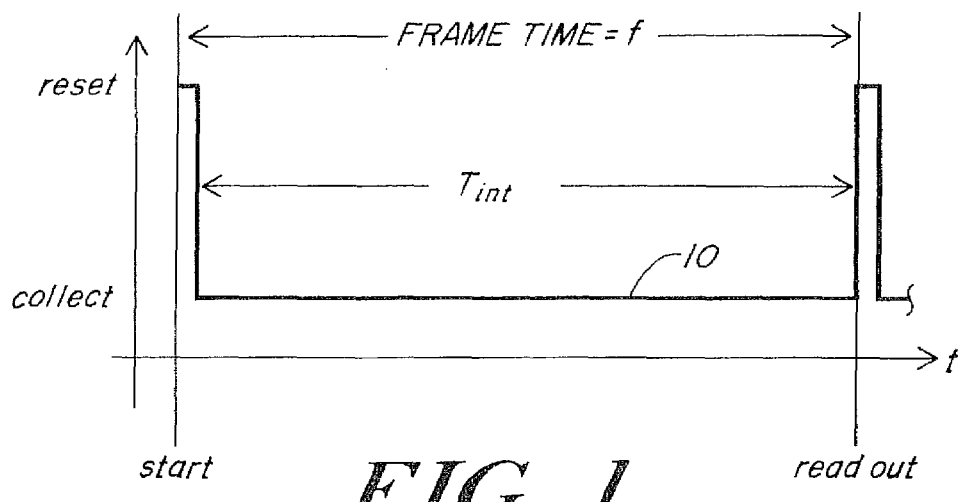
FIG. 1 shows a linear transfer control function with an integration time near maximum integration time.
Figure 2:
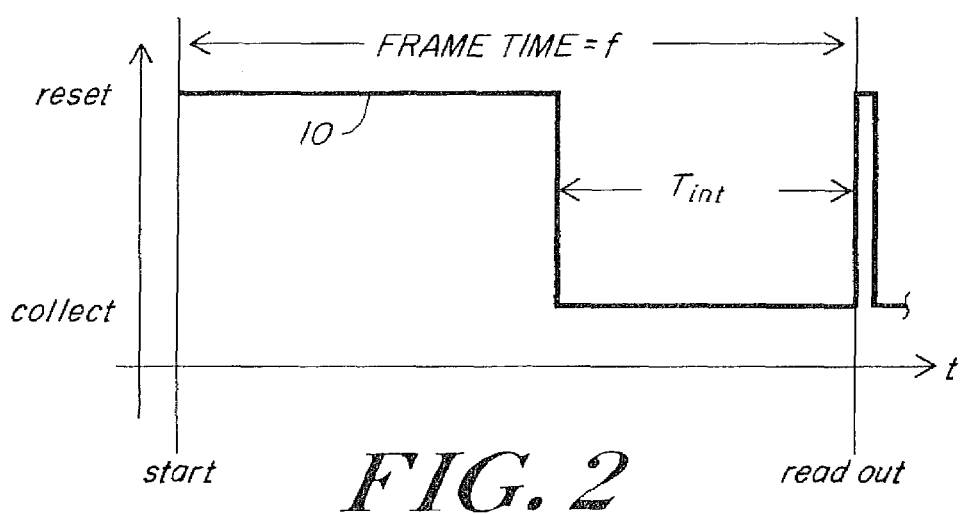
FIG. 2 shows a linear transfer control function with a decreased integration time.
Figure 4:
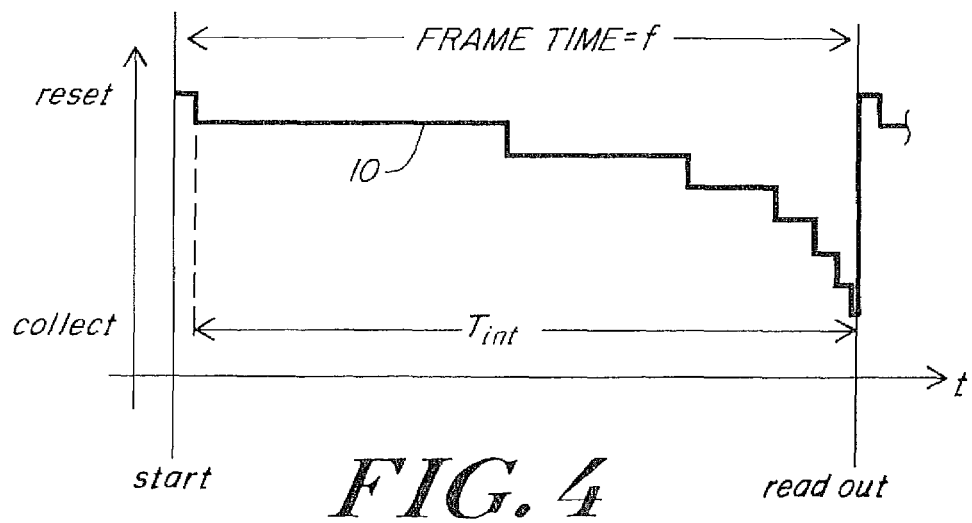
FIG. 4 illustrates a stepped or piecewise discrete-time transfer control function.
Figure 3:
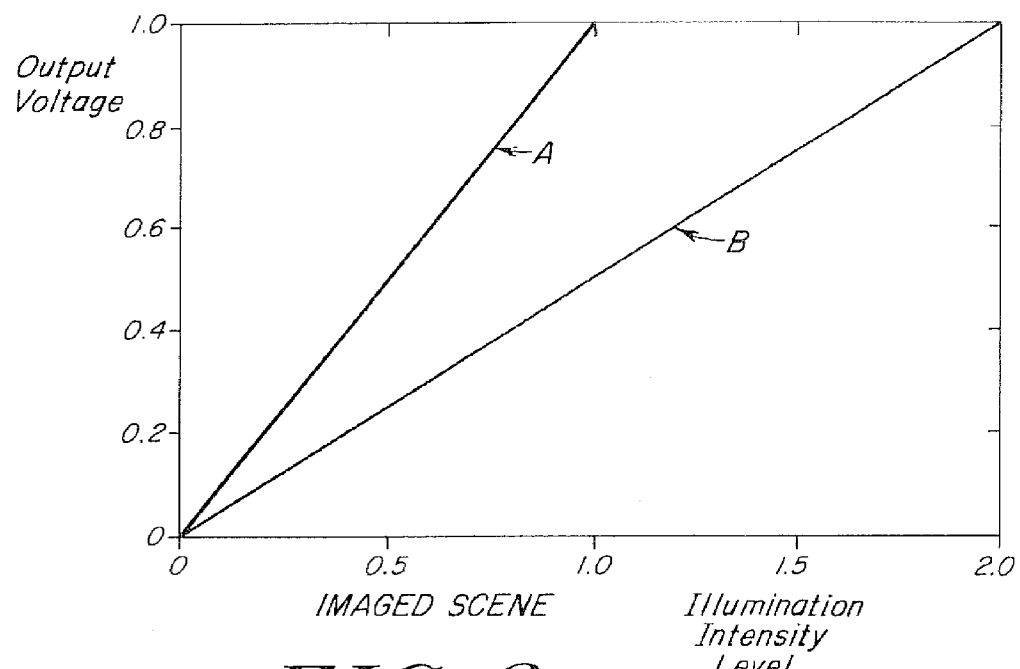
FIG. 3 illustrates mapping of pixel output voltage versus illumination intensity of the imaged scene using different integration times.
Figure 5:
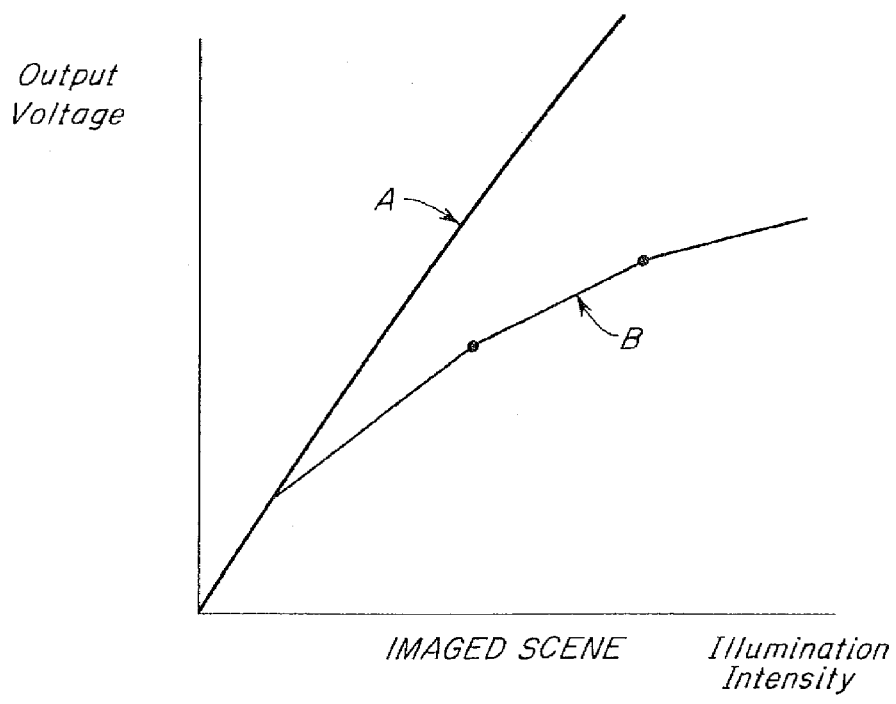
FIG. 5 illustrates mapping of pixel output voltage versus illumination intensity of the imaged scene using a linear transfer control function and a stepped or piecewise discrete-time transfer control function.
Figure 6:
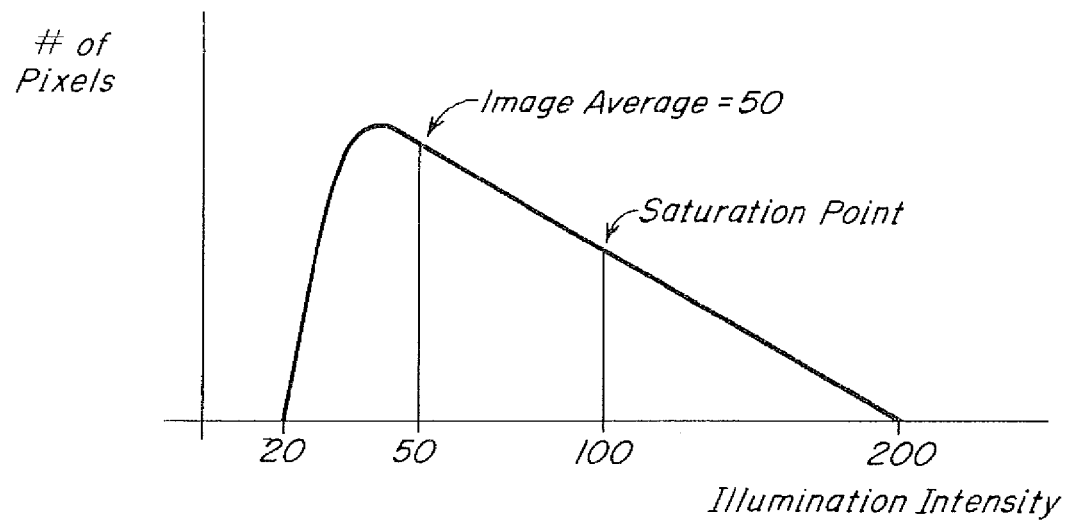
FIG. 6 is a histogram of illumination intensity levels of an actual scene to be imaged.
Figure 7:
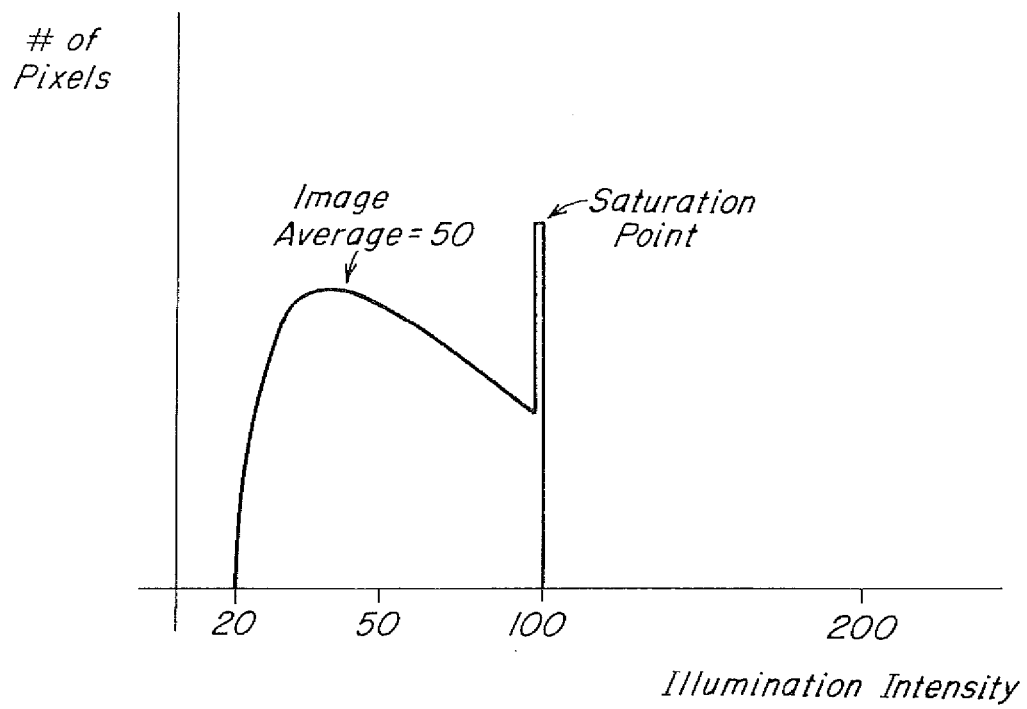
FIG. 7 is a histogram of illumination intensity levels of the imaged scene of FIG. 6 without conventional corrections.
Figure 8:
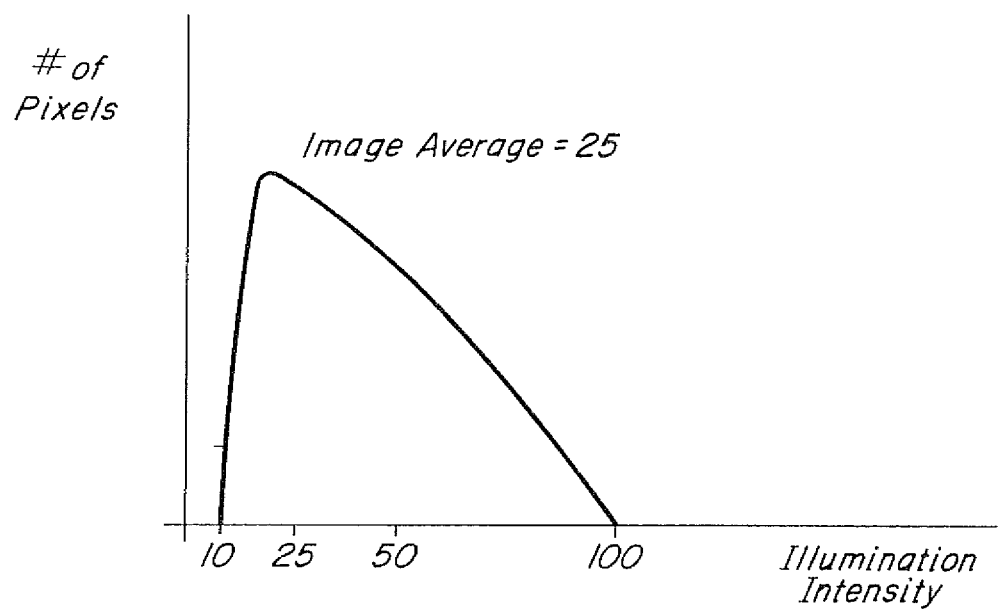
FIG. 8 is a histogram of illumination intensity levels of the imaged scene of FIG. 6 using conventional corrections.
Figure 9:
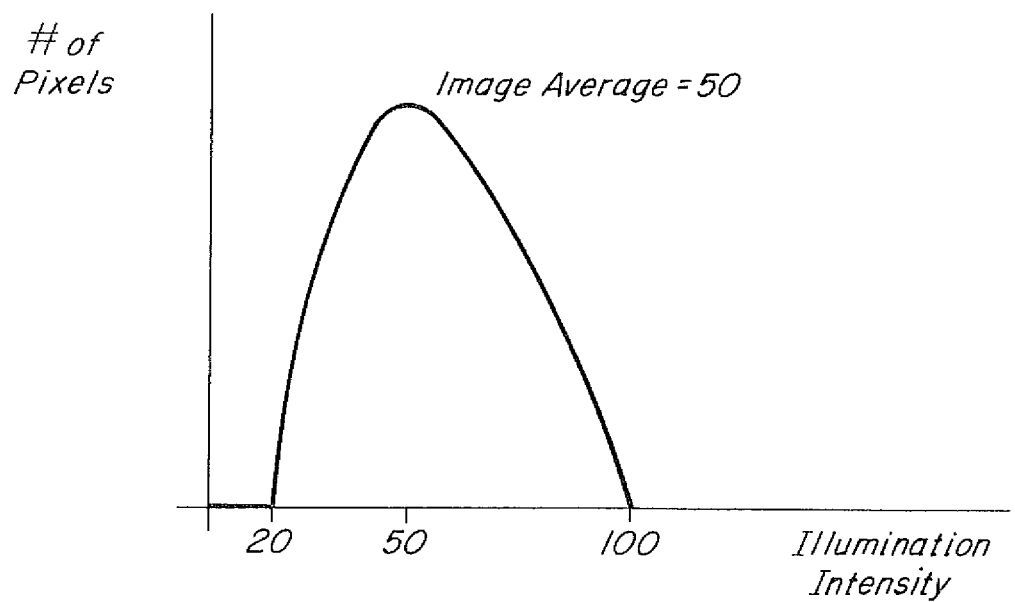
FIG. 9 is a histogram, enabled by the present invention, of illumination intensity levels of the imaged scene of FIG. 6.

More specifically, the present invention adjusts the integration time and manipulates the transfer control function (resulting in the production of the control signal) to realize a histogram of the imaged scene, as illustrated in FIG. 9. In FIG. 9, using a pixel-by-pixel sensitivity adjustment, the entire histogram is made to fit within the range of the sensor such that no saturation results while keeping the image average at 50 to ensure the image is bright enough to be visually appealing and thus not reducing the signal to noise ratio in the pixels of lower illumination intensities where the human eye is more sensitive to noise.

With the techniques of the present invention, the low illumination intensity levels of the scene are emphasized, and the high illumination intensity levels of the scene are discernable, with no pixels becoming saturated during a given frame period, F.

The present invention varies the sensitivity of each pixel of a digital imager so that if a scene has a wide dynamic range, the digital imager can produce a non-linear mapping of the output voltages from the digital imager to digital illumination intensity levels or values representing the imaged scene. According to the concepts of the present invention, the output voltages representing the higher illumination intensity levels of the scene, where the eye is less sensitive to quantization noise, are non-linearly mapped to illumination intensity levels such that the resolution of the higher illumination intensity levels are compressed. Moreover, the output voltages representing the low illumination intensity levels of the scene are amplified to ensure the image is bright enough. The results are imaged scenes with appropriate brightness and no saturation.

The present invention dynamically adjusts the mapping of the output voltages to imaged scene illumination intensity levels, thereby continually compressing or decompressing the resolution of the high illumination intensity levels of the scene, so as to change or unequally distribute the amount of quantization noise for different levels of light (illumination) intensity. Under a completely linear mapping, all possible illumination intensities of the imaged scene would have the same resolution or amount of quantization noise.

The present invention selectively decreases or compresses the resolution of higher illumination intensity levels, by non-linearly adjusting the mapping of the output voltage versus illumination intensity level of the imaged scene map, to increase the saturation point. The result is that given a scene with a wide dynamic range, the output voltages associated with the low illumination intensity level pixels can be amplified enough to have the desired resolution and the output voltages associated with the high illumination intensity level pixels can be mapped to compress the resolution of the high illumination intensity levels to fit within the range of the analog to digital converter associated with the digital imager and avoid saturation. To realize this, in accordance the present invention, a desirable illumination intensity level mapping is automatically determined and the determined illumination intensity level mapping is converted into a transfer control function (resulting in the production of the control signal) for the digital imager. The transfer control function (resulting in the production of the control signal) controls the production or accumulation of charge in the photosensitive element, thus controlling the output voltage of the pixel.

Figure 10:
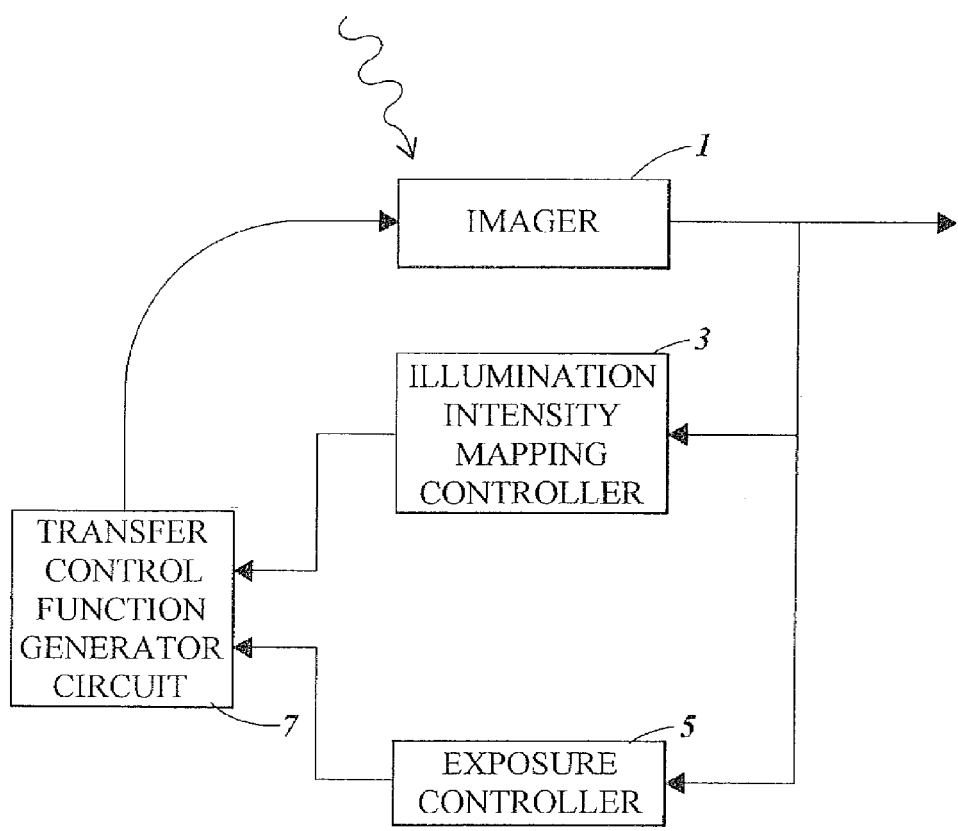
FIG. 10 is a block diagram of the adaptive sensitivity, on a pixel-by-pixel basis, control system according to the concepts of the present invention.

FIG. 10 illustrates one embodiment of the present invention that emphasizes the low illumination intensity levels of the scene, and discerns the high illumination intensity levels of the scene, with no pixels becoming saturated during a given frame period, F. As shown in FIG. 10, a system for adaptively controlling sensitivity, on a pixel-by-pixel basis, of a digital imager includes a digital imager 1, an illumination intensity level mapping controller 3, an exposure controller 5, and a transfer control function generation circuit 7.

The illumination intensity level mapping controller 3 determines a number of pixels of imaged scene having illumination intensity levels within a first defined range of illumination intensity levels. The illumination intensity level mapping controller 3 also determines an illumination intensity level mapping function based upon the determined number of pixels within the first defined range of illumination intensity levels.

The exposure controller 5 determines a number of pixels of the imaged scene having illumination intensity levels within a second defined range of illumination intensity levels and determines an integration time, $T_{int}$, based upon the determined number of pixels having illumination intensity levels within a second defined range of illumination intensity levels.

The transfer control function generation circuit 7 determines a transfer control function based on the determined illumination intensity level mapping function and integration time, $T_{int}$. The transfer control function generation circuit 7 further imposes the determined transfer control function upon a pixel of the digital imager.

An example of a transfer control function generation circuit is described in co-pending U.S. patent application Ser. No. 09/916,822, filed on Jul. 27, 2001, entitled "PRECISE MOS IMAGER TRANSFER FUNCTION CONTROL FOR EXPANDED DYNAMIC RANGE IMAGING." The entire contents of co-pending U.S. patent application Ser. No. 09/916,822, are hereby incorporated by reference.

In a preferred embodiment, the digital imager 1 receives the transfer control function, and produces a control signal 10 therein in accordance with the received transfer control function.

It is noted that the transfer control function generation circuit 7 could also produce the control signal 10 directly and feed it to the digital imager 1, wherein the control signal 10 is produced in accordance with the determined transfer control function based on the determined integration time, $T_{int}$, and determined illumination intensity level mapping function.

The first defined range of illumination intensity levels is a range of illumination intensity levels including an illumination intensity level representing pixel saturation, and the second defined range of illumination intensity levels is a range of illumination intensity levels including an illumination intensity level representing a minimum illumination intensity level that may be adjusted for pixel noise or pixel offset.

The illumination intensity level mapping controller 3 determines a number of pixels of image data having illumination intensity levels within a first defined range of illumination intensity levels from a frame of pixels of image data created by the digital imager, from a partial frame of pixels of image data created by the digital imager, from a defined area within a frame of pixels of image data created by the digital imager, or from a user-defined area within a frame of pixels of image data created by the digital imager.

The illumination intensity level mapping function can be either calculated or selected from a plurality of pre-specified illumination intensity level mapping functions, preferably from eight pre-specified illumination intensity level mapping functions, based upon the determined number of pixels within the first defined range of illumination intensity levels. Moreover, the transfer control function can be either calculated or selected from a plurality of pre-specified transfer control functions based upon the determined illumination intensity level mapping function and determined integration time, $T_{int}$.

Furthermore, the determination of the transfer control function can realized during the generation of a second frame of image data that is immediate subsequent to the frame of image data being used to make the determination. In this situation, the new transfer control function is imposed upon pixels during the generation of a third frame of image data, the third frame being immediate subsequent to the second frame of image data.

On the other hand, if the determination is being made on only a partial frame, the determination of the transfer control function can realized during the generation of a first frame of image data which is the frame of image data having the partial frame of image. In this situation, the new transfer control function is imposed upon pixels during the generation of a second frame of image data, the second frame being immediate subsequent to the first frame of image data.

It is further noted that the frame period, F, or other frame parameters can be adjusted on the fly to enable implementation of the present invention.

The illumination intensity level mapping function may be determined independent of, dependent upon, after, before, or substantially simultaneous with the determination of the integration time, $T_{int}$. Moreover, the illumination intensity level mapping function may be a composite function comprising individual discrete functions wherein each individual discrete illumination intensity level mapping function is determined based upon the determination of a number of pixels within a defined range of illumination intensity levels. Each individual illumination intensity level mapping function is associated with a defined range of illumination intensity levels.

The illumination intensity level mapping controller 3, in one embodiment, determines a plurality of number of pixels, each determined number of pixels corresponding to one defined range of illumination intensity levels. In this embodiment, the illumination intensity level mapping controller 3 determines a plurality of illumination intensity level mapping functions, each determined illumination intensity level mapping function corresponding to one defined range of illumination intensity levels. Each illumination intensity level mapping function is determined based upon the determined number of pixels within the associated defined range of illumination intensity levels.

In this embodiment, the transfer control function generation circuit 7 determines a transfer control function based on the plurality of determined illumination intensity level mapping functions and imposes the determined transfer control function upon a pixel of the digital imager.

In another implementation of the system illustrated in FIG. 10, the illumination intensity level mapping controller 3 determines a number of saturated pixels and selects a first illumination intensity level mapping function when the determined number of saturated pixels is above a first threshold.

The illumination intensity level mapping controller 3 determines a number of pixels having illumination intensity levels within a defined range of levels and selects a second illumination intensity level mapping function when the determined number of pixels is below a second threshold. The transfer control function generation circuit 7 determines a transfer control function based on the selected illumination intensity level mapping function and imposes the determined transfer control function upon a pixel of the digital imager.

The transfer control function may comprise a plurality of discrete transfer control functions, preferably eight discrete transfer control functions. In this embodiment, the determined illumination intensity level mapping function comprises a plurality of discrete illumination intensity level mapping functions, preferably eight discrete illumination intensity level mapping functions. Each discrete transfer control function is determined based on one of the plurality of distinct illumination intensity level mapping functions.

Each discrete illumination intensity level mapping function may be a linear illumination intensity level mapping function. The plurality of discrete linear illumination intensity level mapping functions form a composite piece-wise linear illumination intensity level mapping function, the composite piece-wise linear compression being the determined illumination intensity level mapping function. The determined composite illumination intensity level mapping function is a nearly logarithmic illumination intensity level mapping function.

In a further implementation, the illumination intensity level mapping controller 3 selects a first illumination intensity level mapping function, and the transfer control function generation circuit 7 determines a first transfer control function based on the selected first illumination intensity level mapping function and imposes the determined first transfer control function upon a pixel of the digital imager. The illumination intensity level mapping controller 3 then determines a histogram of illumination intensity levels of pixels of the imaged scene being generated by the digital imager having the determined first transfer control function imposed thereon and determines an illumination intensity level maximum, the illumination intensity level maximum representing a greatest illumination intensity level for a pixel in a sample forming the histogram. The illumination intensity level mapping controller 3 determines a second illumination intensity level mapping function, based on the determined intensity level maximum, the second illumination intensity level mapping function preventing the generation of any saturated pixels and providing a dynamic range of image data enabling each level in the histogram to be realized by the digital imager. The transfer control function generation circuit 7 then determines a second transfer control function based on the determined second illumination intensity level mapping function and imposes the determined second transfer control function upon a pixel of the digital imager. The first illumination intensity level mapping function represents a maximum compression of the resolution of the high illumination intensity levels.

As noted above, one way of manipulating the transfer control function is to use a stepped or piecewise discrete-time transfer control function. By using a stepped or piecewise discrete transfer control function, the map of the pixel output voltage versus illumination intensity can be modified to enable a wider range of possible illumination intensity levels before saturation, while emphasizing low illumination intensity levels.

However, to use a stepped or piecewise discrete-time transfer control function, each stepped transfer control function or control signal level must be determined as well as the timing of the transition points between discrete transfer control functions or discrete control signal levels.

In the preferred embodiment of the present invention, the transfer control function is a stepped or piecewise discrete-time transfer control function, thereby producing a control signal that is a stepped or piecewise discrete-time control signal.

When the transfer control function generation circuit 7 receives $T_{int}$, the first transition point from a first discrete transfer control function to a discrete second transfer control function of the composite transfer control function is immediately set. The illumination intensity level mapping function, g, determines the actual discrete transfer control functions, wherein the actual discrete transfer control functions determine each of the actual discrete control signal levels.

Figure 14:
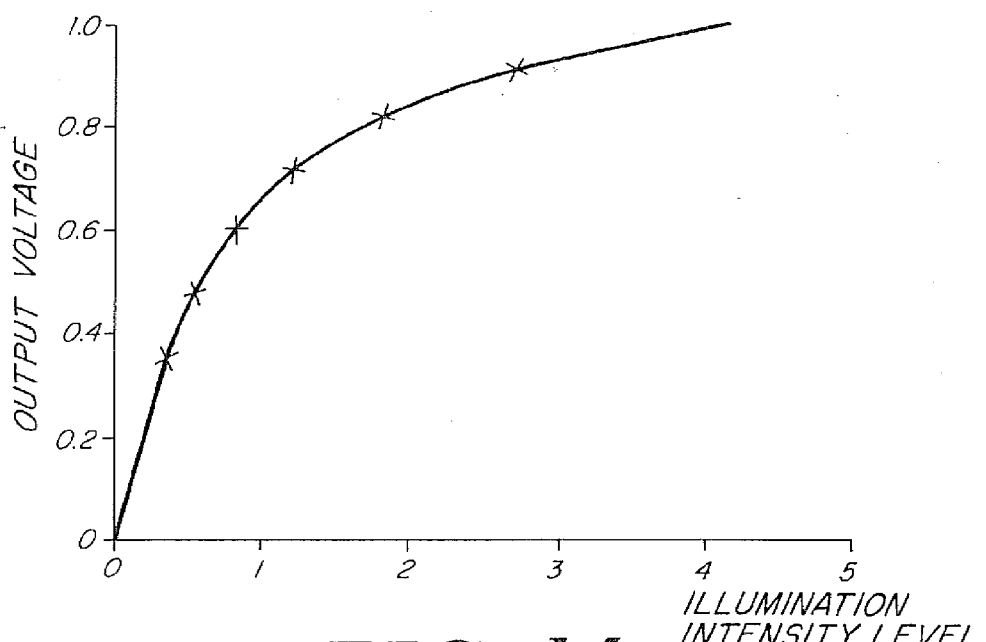
FIG. 14 shows a desired map of output voltage versus illumination intensity level for a scene imaged to produce the transfer control function of FIG. 13.

In the example discussed below, the illumination intensity level mapping function, g, is derived from the desired map of output voltage versus illumination intensity level of the imaged scene illustrated in FIG. 14. As seen in FIG. 14, the desired map of output voltage versus illumination intensity level of the imaged scene is a piece-wise discrete mapping, with each discrete mapping corresponding to a different compression of the resolution of the associated illumination intensity level range. As noted below, each discrete compression of the resolution of the associated illumination intensity level range corresponds to a level, $b_1$, in the transfer control function. As the compression of the resolution of the associated illumination intensity level range is increased, the corresponding level, $b_1$, is decreased.

As noted above, in a preferred embodiment of the present invention, the transfer control function is a discrete piecewise linear function, having eight pieces or steps formed by seven transition points, that produces a nearly logarithmic response.

Figure 13:
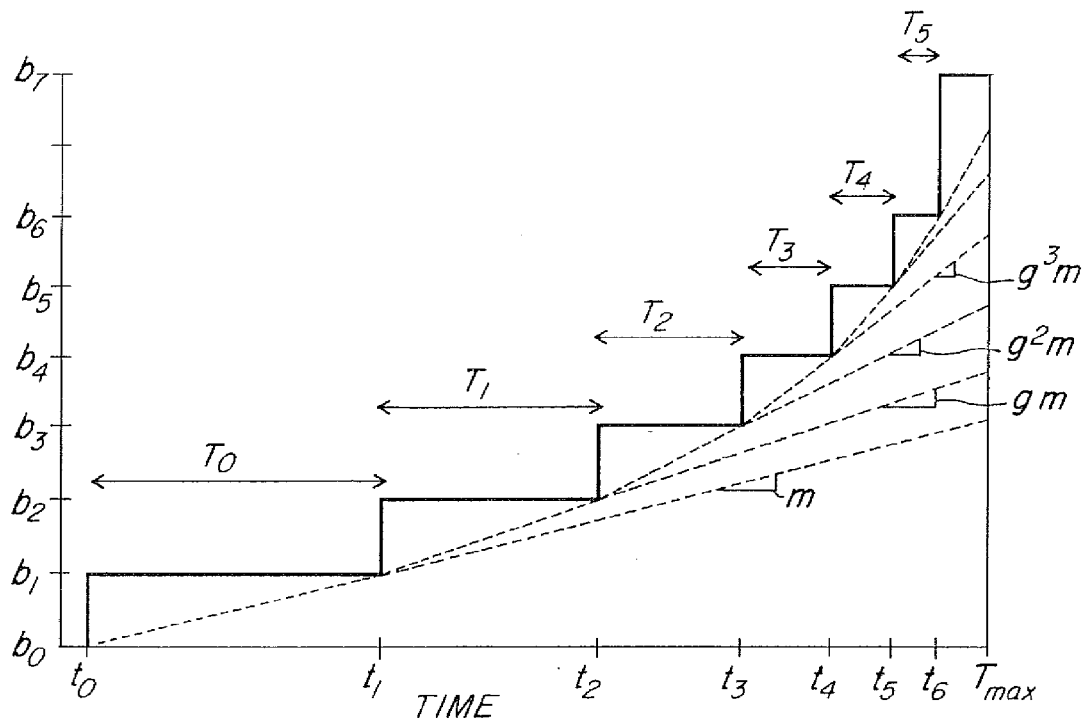
FIG. 13 shows calculating the timing of the transition points for a transfer control function according to the concepts of the present invention.

An example of a stepped or piecewise discrete-time transfer control function, according to a preferred embodiment of the present invention, is illustrated in FIG. 13. In FIG. 13, the timing of the transition points, t, is set forth on the horizontal axis, and a level, b, corresponding to the transfer control function, which corresponds to an amount of the subsequently produced control signal being stepped down from a reset level, is set forth on the vertical axis.

The stepped or piecewise discrete-time transfer control function in one embodiment of the present invention, as illustrated in FIG. 13, is realized by:
1. Setting the slope of region from the first transition point, $t_1$, to the second transition point, $t_2$, to be m;
2. Setting the slope of the region from the second transition point, $t_2$, to the third transition point, $t_3$, to be gm;
3. Setting the slope of the region from the third transition point, $t_3$, to the fourth transition point, $t_4$, to be $g^2m$;
4. Setting the slope of the region from the fourth transition point, $t_4$, to the fifth transition point, $t_5$, to be $g^3m$;
5. Setting the slope of the region from the fifth transition point, $t_5$, to the sixth transition point, $t_6$, to be $g^4m$; and
6. Setting the slope of the region from the sixth transition point, $t_6$, to the seventh transition point, $t_7$ or $T_{max}$ to be $g^5m$.

If more than seven transition points are desired, the slope of the region between subsequent transition points would continue to increase by a factor g.

With such an approach, when the exposure controller 5 specifies the desired integration time, $T_{int}$, and the illumination intensity level mapping controller 3 specifies the desired illumination intensity level mapping function, g, the stepped transfer control function is completely constrained; however, it is still necessary to determine when the transition points between the discrete transfer control functions occur during the overall frame period, $T_{max}$.

As noted above, in this preferred embodiment of the present invention as illustrated in FIG. 13, there are seven transition points. These seven transition points can be determined by solving the resulting sets of simultaneous equations:

$$t_0 = T_{max} - T_{int}$$

$$m = (b_1 - b_0)/T_0$$

$$mg = (b_2 - b_1)/T_1$$

$$mg^2 = (b_3 - b_2)/T_2$$

$$mg^3 = (b_4 - b_3)/T_3$$

$$mg^4 = (b_5 - b_4)/T_4$$

$$mg^5 = (b_6 - b_5)/T_5$$

$$mg^6 = (b_7 - b_6)/T_6$$

$$T_{max} = t_0 + T_0 + T_1 + T_2 + T_3 + T_4 + T_5 + T_6$$

The above equations use the variables all referenced in FIG. 13. In a preferred embodiment, it is assumed that the levels, $b_0$ through $b_7$, corresponding to the transfer control function, which individually correspond to an amount of the subsequently produced control signal being stepped down from a reset level, are equally spaced by a quantity $\Delta b$ (except that $(b_7 - b_6 = 2\Delta b)$, the above equations, solving for $T_0, T_1, T_2, T_3, T_4,$ and $T_5$ yield $$T_0 = (g^6)/(g^6 + g^5 + g^4 + g^3 + g^2 + g + 2) * T_{int}$$

$$T_1 = (T_0)/g$$

$$T_2 = (T_1)/g$$

$$T_3 = (T_2)/g$$

$$T_4 = (T_3)/g$$

$$T_5 = (T_4)/g$$

With the solving for $T_0, T_1, T_2, T_3, T_4,$ and $T_5$, the seven transition points; $t_0, t_1, t_2, t_3, t_4, t_5,$ and $t_6$; are:

$$t_0 = T_{max} - T_{int}$$

$$t_1 = t_0 + T_0$$

$$t_2 = t_1 + T_1$$

$$t_3 = t_2 + T_2$$

$$t_4 = t_3 + T_3$$

$$t_5 = t_4 + T_4$$

$$t_6 = t_5 + T_5$$

It is noted that the levels, $b_1$, need not be evenly spaced to find the transition points. The equal spacing of b is just an example of creating a transfer control function according to the concepts of the present invention.

In a preferred embodiment of the present invention, the determination of the timing of the transition points is realized by dedicated hardware due to the repetitive nature of the calculation. Once $T_0$ is found, one simply does a divide by the same denominator five more times. In the preferred embodiment, $T_0$ is not calculated by dedicated hardware due to inefficiencies, thus the number of possible g's is limited and a table lookup is used to find $T_0$.

In this embodiment, the transition points between the plurality of discrete transfer control functions, which form a composite transfer control function, are determined following the determination of an integration time, $T_{int}$, and an illumination intensity level mapping function, the illumination intensity level mapping function providing the proper compression of the resolution of the high illumination intensity levels of imaged scene and proper emphasis of the low illumination intensity levels of imaged scene.

In a preferred embodiment, the composite transfer control function has eight discrete transfer control functions and seven transition points. The first transition point is equal to a difference between a maximum possible integration time, $T_{max}$, or frame period, F, and the determined integration time, $T_{int}$. Subsequent transition points, assuming that the levels, $b_i$, are equally spaced by a quantity $\Delta b$ (except that $(b_7-b_6=2\Delta b)$), are equal to a sum of all previous transition points and a time $T_s=((g^{n-1})/((g^{n-1}+g^{n-2}+\ldots+g^2+g+2)(g^{(p)})))*T_{int}$, where g is equal to the determined illumination intensity level mapping function, n is equal to a total number of transition points, p is equal to a positional number of the discrete transfer control function being calculated, and $T_{int}$ is equal to the determined integration time. If the levels, $b_i$, are not equally spaced by a quantity $\Delta$ b, the equation would be slightly different depending upon the spatial relationship between levels, $b_i$.

Figure 15:
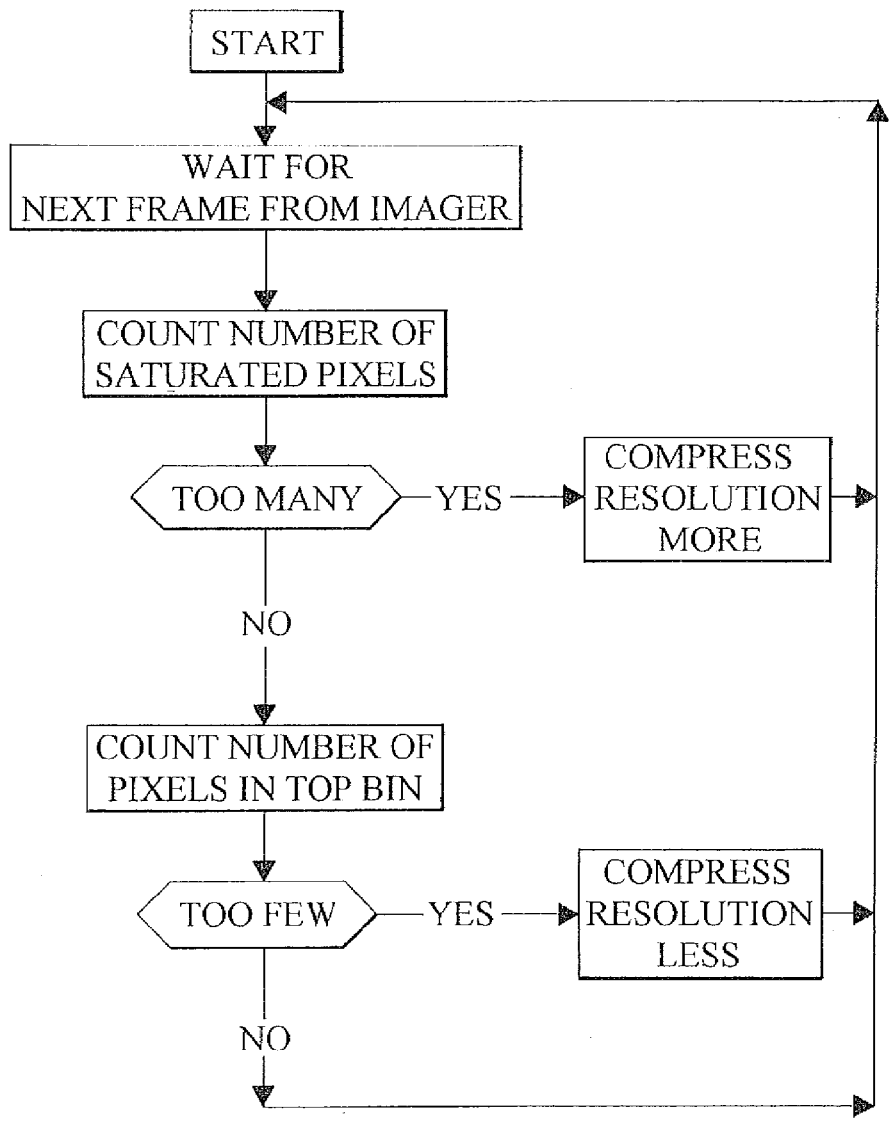
FIG. 15 illustrates a flowchart showing the operations of an illumination intensity mapping controller according to another embodiment of the present invention.

FIG. 15 illustrates a process utilized by an illumination intensity mapping controller of a preferred embodiment of the present invention. As illustrated in FIG. 15, the illumination intensity mapping controller takes the imaged scene from the sensor and counts the number of saturated pixels. If there are too many saturated pixels, the illumination intensity mapping controller increases the amount of compression upon the resolution of the high illumination intensity levels. The illumination intensity mapping controller also counts the number of pixels in the upper region (bin) of a histogram of the imaged scene to determine if the imaged scene fills the entire range of the histogram. If there are not enough pixels in the upper region (bin), the illumination intensity mapping controller decreases the amount of compression upon the resolution of the high illumination intensity levels. The illumination intensity mapping controller continues this process until there are no saturated pixels and the histogram is completely used.

This approach works well for video applications in that the illumination intensity mapping controller can continuously run without having to drastically change the illumination intensity mapping function to determine how to best set it. If the number of illumination intensity mapping steps is minimized under the constraint of stability, eight illumination intensity mapping steps are sufficient. This allows the illumination intensity mapping function to be set within 16 frames as a maximum.

Figure 16:
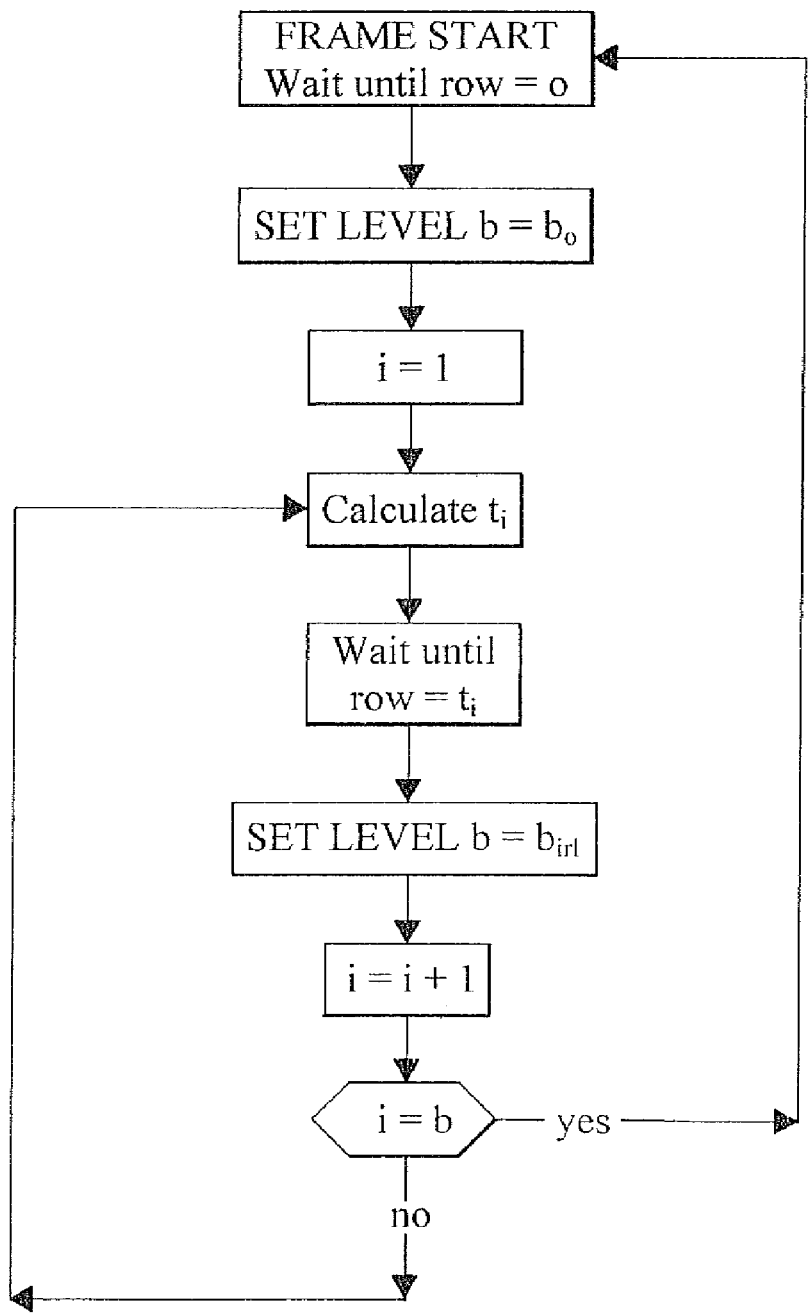
FIG. 16 illustrates a flowchart showing the operations of a transfer control function generator circuit according to another embodiment of the present invention.

FIG. 16 illustrates a process utilized by a transfer control function generator circuit of a preferred embodiment of the present invention. As illustrated in FIG. 16, the transfer control function generator circuit sets the initial level, b, of the transfer control function to $b_0$. A step value, i, is set to a value of 1. The timing of the transition point, $t_i$, is calculated. The transfer control function generator circuit goes into a standby state, sending the last establish level, b, to the digital imager, until the calculated transition point, $t_1$, is realized. When the calculated transition point, $t_1$, is realized, a new level, b, is set equal to $b_{i+1}$. The step value, i, is incremented by 1. The calculating of the transition point, $t_1$, and setting of the level, b, is repeated until the step value, i, is equal to 6.

It is to be recognized that the present invention contemplates both employing preprogrammed illumination intensity level mapping functions as well as computing custom illumination intensity level mapping functions on the fly during a given frame analysis. The use of preprogrammed illumination intensity level mapping functions can be preferred for applications in which computational power is to be minimized. Real time computation of illumination intensity level mapping functions can be preferred for applications in which flexibility in sensitivity control is desired.

For example, given a frame analysis in which a large number of pixels have a particular intensity level, a customized illumination intensity level mapping function computed to allocate a large number of output levels to that common intensity level would be optimal for efficiently parceling the output range levels. Similarly, computation of a customized illumination intensity level mapping function can be optimal for allocating a large number of output levels to the intensity range of a particular physical region of pixels of an image frame. Such a region may be of interest for its inclusion of, e.g., moving objects, or in general, objects of interest or importance in a scene. The present invention further contemplates use of both preprogrammed and custom, on-the-fly illumination intensity level mapping functions for a single application, whereby the benefits of both approaches can be obtained.

The adaptive sensitivity control, on a pixel-by-pixel basis, of the present invention preferably is implemented to operate automatically, without the necessity for user control or input, to enable automatic, real time, adaptive adjustment of the digital imager for maximizing image quality.

Figure 11:
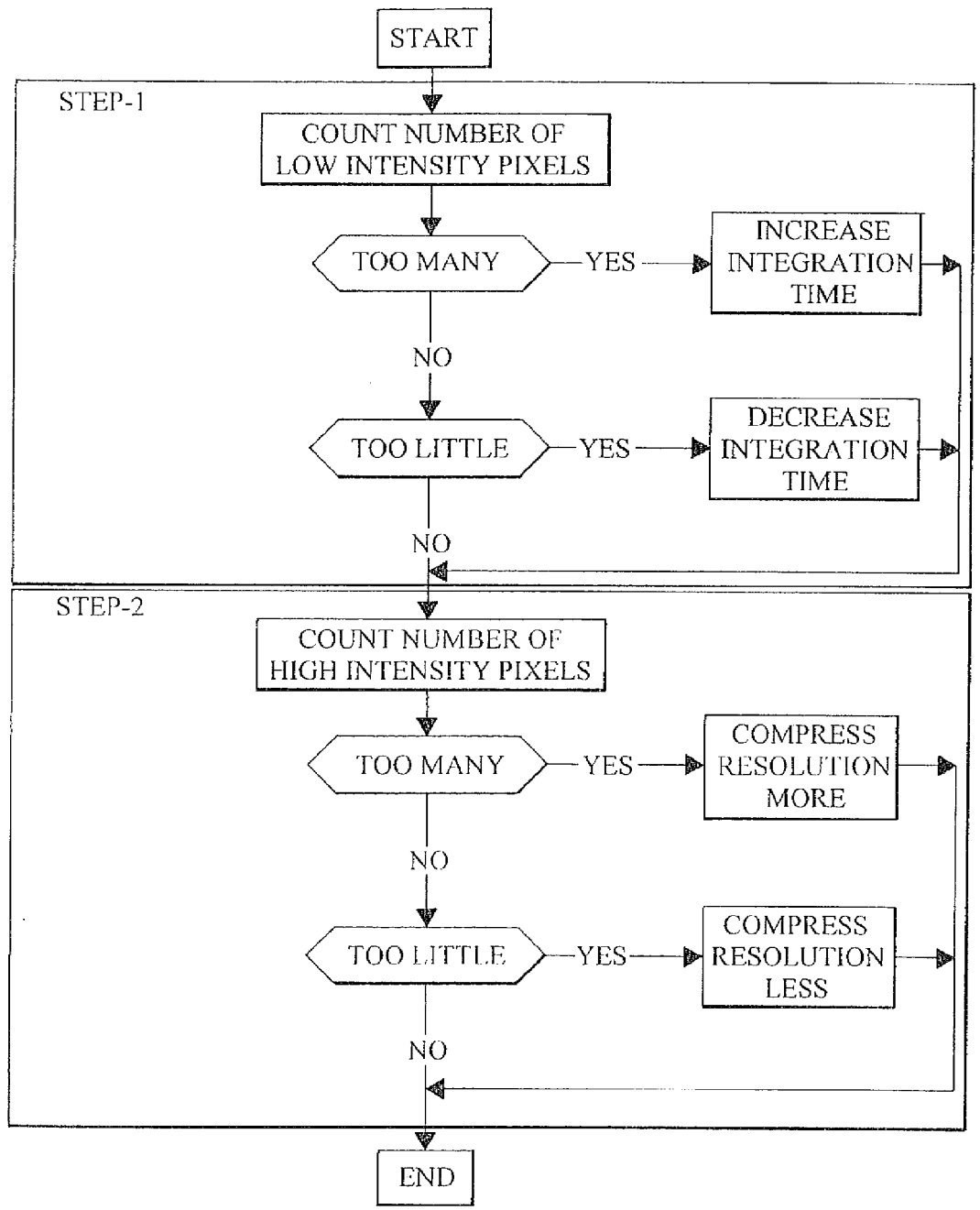
FIG. 11 is a flowchart showing one implementation of adaptive sensitivity control, on a pixel-by-pixel basis, according to the concepts of the present invention.

FIG. 11 illustrates another embodiment of the present invention. As illustrated in FIG. 11, in a first step, the integration time, $T_{int}$, of the digital imager is controlled. Integration time control is specifically implemented by controlling the number of pixels associated with low illumination intensity levels. This has the effect of shifting the dynamic range of the digital imager relative to the scene illumination intensity range.

In one example, intensity levels 0 through 3 are defined as a specified low intensity level range. Given that the low intensity level range includes levels 0 through 3, this accounts for 0.1% of the total number of intensity levels of a 4,096 output intensity levels imager. The integration time is controlled in accordance with the present invention so that the same percentage, 0.1%, of the total number of pixels, i.e., 0.1% of a 307,200 pixel imager, or 307 pixels, have the intensity levels of 0, 1, 2, or 3. This acts to enforce a condition whereby the entire 4096 levels are efficiently parceled across the intensity range of the scene.

Preferably, the number of pixels selected to be associated with the low intensity level range is defined as a range; e.g., in the example just given, 307+/−30 pixels are preferably assigned to the range. The use of a number range of pixels enables the introduction of hysteresis, which stabilizes the system. Another way to introduce the hysteresis is to use an intensity level range. For example, if the number of pixels at the intensity levels of 0 or 1 is less than 307, in response, the exposure time can be decreased. Similarly, if the number of pixels at the intensity levels of 0, 1, 2, 3, or 4 is more than 307, then the exposure time can be increased. In this example, the threshold value for the number of pixels is 307 and does not have any ranges, but the intensity level itself has a range from "0 or 1" to "0, 1, 2, 3, or 4". This introduction of intensity level ranges also provides hysteresis. The low intensity level range is preferable small, and typically the smaller the better, except that if too small, e.g., including only the 0 level, the algorithm may not be robust to noise levels or to the occurrence of faulty pixels.

In the first step of FIG. 11, the number of pixels of the frame that are found to be associated with the defined low intensity ranges are counted from the frame illumination intensity histogram. If the number of low intensity range pixels is larger than that number corresponding to the percentage of low intensity ranges as a function of the total number of intensity levels, the integration time of the digital imager is increased. Conversely, if the number of pixels is smaller, the digital imager integration time is decreased.

In step 2 of FIG. 11, the illumination intensity level mapping function is adjusted. This is specifically realized by selecting an illumination intensity level mapping function to make a correspondence between a number of pixels and a high illumination intensity range. This correspondence is particularly made so that the distribution of pixels goes to zero at the saturation level of the digital imager, as shown in FIG. 9. The high illumination intensity range can be defined as, e.g., the intensity levels 4,095, 4,094, 4,093, and 4,092, given 4096 output levels. For this example, the number of pixels to be associated with these output levels is then 0.1% of the total number of pixels. This pixel number can then be defined as the range between 277 and 337 pixels, for example, for a 307,200 pixel imager.

With this step completed, the transfer control function of the digital imager is adjusted such that the digital imager output levels are adjusted in the manner illustrated in FIG. 9. It is recognized in accordance with the present invention that the step of adjustment of imager integration time can be carried out after or in parallel with the step of adjustment of the level of digital imager control signal. The order of steps shown in the flowchart of FIG. 11 is an example only.

A simple example is described below to illustrate the concepts of the present invention.

Consider an example digital imager having a pixel array size of 4×4, where for a given scene being imaged in a frame under analysis, all the pixels in each row have the same intensity level, and where the intensity level of each pixel is output in 4-bits ranging in output levels between 0 and 15.

Given further an example histogram of scene intensity levels to be imaged by the particular pixels of the digital imager is as follows:

3 for the first pixel row,
6 for the second pixel row
300 for the third pixel row, and
600 for the fourth pixel row.

In other words, the scene intensity level ratios between the pixel rows are:

1:2 for the first and second pixel rows,
1:50 for the second and third pixel rows, and
1:2 for the third and fourth pixel rows.

In a conventional sensitivity control technique, in order to reduce the intensity level for the fourth row from 600 to 15, which is the highest intensity level capable of the digital imager, the intensity of each pixel would need to be reduced by a factor of 40 by decreasing the integration time, with the new intensities after the integration time adjustment given as:

0 (=1/40) for the first pixel row,
0 (=2/40) for the second pixel row,
8 (=300/40) for the third pixel row, and
15 (=600/40) for the fourth pixel row.

Note that this results in a loss of the original intensity difference between the first and second pixel rows, and therefore results in a poor output image.

This deficiency is overcome by the technique of the present invention. Following the technique of the present invention described above, the intensities of the pixels are adjusted as follows.

(a) Each illumination intensity level is divided by a factor of 3, by reducing the integration time, in order to bring the lowest illumination intensity level of the scene being imaged to 1, the designated low illumination intensity level of the digital imager. The new illumination intensity output level of pixel rows one-four are then given as 1(=3/3), 2(=6/3), 100 (=300/3), and 200 (=600/3), respectively.

(b) Each illumination intensity level is subjected to a non-linear illumination intensity level mapping function. The illumination intensity levels of 1 and 2 stay substantially the same, but the resolution of the highest illumination intensity level pixel region, having the intensity level 200, is compressed strongly to map highest illumination intensity level of the scene being imaged to the maximum intensity level 15 of the digital imager. The resolution of the high illumination intensity level pixel region, just below the highest illumination intensity level pixel region, is compressed not as strongly, and therefore the illumination intensity level of the third pixel row is set at 9.

With these steps, the technique of the present invention converts the original pixel row illumination intensity level distribution of 1, 2, 300, and 600 from the scene into imager output levels of 1, 2, 9, 15. The original condition in which the four pixel rows have different illumination intensity levels is preserved, while the image illumination range is fully mapped to the output range characteristic of the digital imager.

The present invention contemplates a wide range of implementation alternatives for accommodating various operating considerations. For example, the computational load of the method described above can be relatively large due to the use of an illumination intensity level histogram calculation. A number of alternative methods can be employed to reduce the computational load, each at some cost of performance degradation. It is found, however, that the most prominent performance degradation is generally manifested only as a longer settling time when the illumination intensity of a scene is changing significantly; such is typically considered to be an acceptable condition.

In a first example alternative technique, the number of illumination intensity levels of the histogram calculation is reduced. For example, 4,096 original illumination intensity levels can be replaced with a smaller number, e.g., four, illumination intensity level groups. The illumination intensity level groups 1, 2, 3, and 4 each can be mapped to, e.g., illumination intensity levels of 0-523, 524-1,047, 1048-1,571, and 1,572-4,095, respectively. This grouping of illumination intensity levels significantly reduces the needed computational load.

In a further alternative technique, the histogram calculation can be eliminated. In this technique, the pixel illumination intensity distribution is specified to be even across 4095 levels. In this case, 75 pixels are designated for each illumination intensity level for a 640×480 pixel array, because 640×480/4,095=75. Therefore, 150 (=75×2) pixels are designated for the illumination intensity levels 0 and 1 of a low illumination intensity range.

Figure 12:
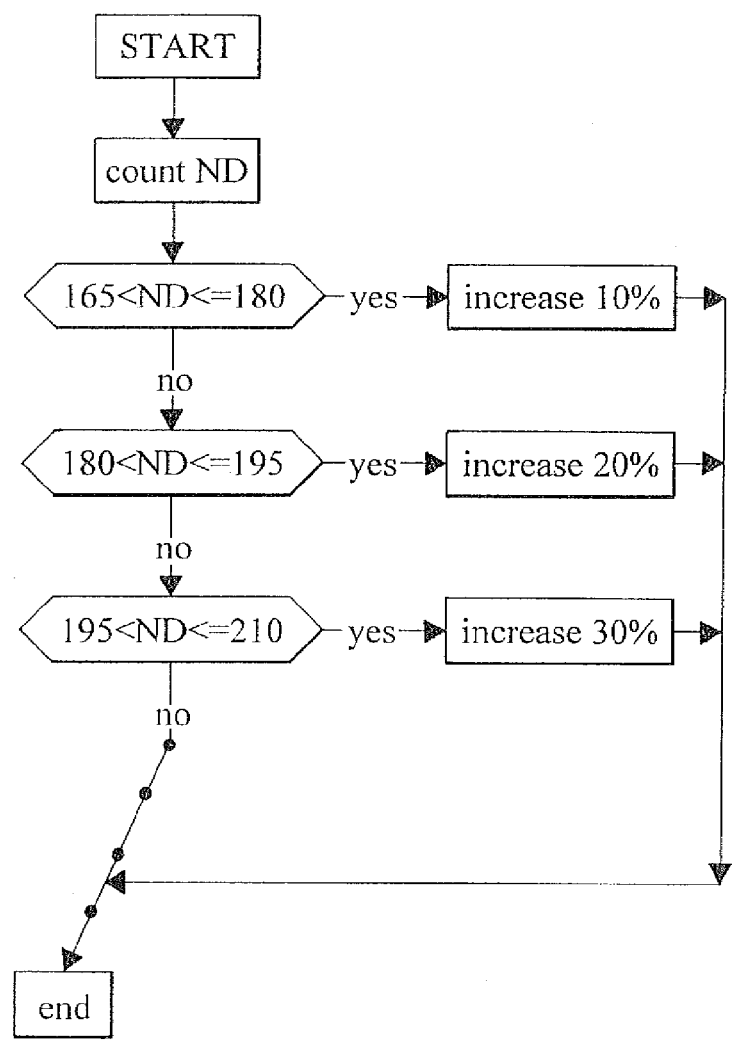
FIG. 12 is a flowchart showing another implementation of adaptive sensitivity control, on a pixel-by-pixel basis, according to the concepts of the present invention.

FIG. 12, illustrates a further embodiment of the present invention for establishing the integration time. As shown in FIG. 12, the total number of pixels for the illumination intensity levels 0 and 1 are counted, and noted as NumberDark (ND). After determining ND, the process determines the adjustment to the integration number to reduce the value of ND. The method for increasing the integration time to reduce ND is as follows:

(1) If 165<ND<=180, increase the integration time by 10%;
(2) If 180<ND<=195, increase the integration time by 20%;
(3) If 195<ND<=210, increase the integration time by 30%;
(4) If 210<ND<=225, increase the integration time by 40%;
(5) If 225<ND<=240, increase the integration time by 50%;
(6) If 240<ND<=270, increase the integration time by 70%;
(7) If 270<ND<=300, increase the integration time by 90%;
(8) If 300<ND<=450, increase the integration time by 150%;
(9) If 450<ND<=600, increase the integration time by 250%;
(10) If 600<ND<=900, increase the integration time by 400%;
(11) If 900<ND<=1500, increase the integration time by 750%;
(12) If 1500<ND, increase the integration time by 1,000%; and If ND is between 135 and 165, there is no change in integration time.

If ND is less than 135, the following rules are instead applied to decrease the integration time:

(1) If 120<ND<=135, decrease the integration time by 11%;
(2) If 105<ND<=120, decrease the integration time by 25%;
(3) If 90<ND<=105, decrease the integration time by 42%;
(4) If 75<ND<=190, decrease the integration time by 66%;
(5) If 60<ND<=75, decrease the integration time by 100%;
(6) If 30<ND<=60, decrease the integration time by 233%;
(7) If 25<ND<=30, decrease the integration time by 400%;
(8) If 20<ND<=25, decrease the integration time by 500%;
(9) If 15<ND<=20, decrease the integration time by 650%; and
(10) If ND<=15, decrease the integration time by 1,000%.

Before, after, or simultaneous with this integration time control, the illumination intensity level mapping function of the digital imager is controlled so that the number of pixels that have the illumination intensity levels of either 4095 or 4094 is controlled to be between 135 and 165. The number of such "bright" pixels, high illumination intensity level pixels, is counted and designated NumberBright (NB), and then the illumination intensity level mapping function is adjusted accordingly. In one example, the illumination intensity level mapping function is selected from a number, e.g., eight, different illumination intensity level mapping functions available. It is contemplated in accordance with the present invention that any reasonable number of functions can be provided.

In this embodiment, the following rules are applied, based on the counted NB, to increase or decrease the compression of the resolution of the high illumination intensity level through the illumination intensity level mapping function of the digital imager:

(1) If 165<NB<=200, invoke a stronger compression upon the resolution of the high illumination intensity levels by one notch.
(2) If 200<NB<=300, invoke a stronger compression upon the resolution of the high illumination intensity levels by two notches.
(3) If 300<NB<=400, invoke a stronger compression upon the resolution of the high illumination intensity levels by three notches.
(4) If 400<NB<=500, invoke a stronger compression upon the resolution of the high illumination intensity levels by four notches.
(5) If 500<NB<=600, invoke a stronger compression upon the resolution of the high illumination intensity levels by five notches.
(6) If 600<NB<=700, invoke a stronger compression upon the resolution of the high illumination intensity levels by six notches.
(7) If 700<NB, invoke a stronger compression upon the resolution of the high illumination intensity levels by seven notches.
(8) If 120<NB<=135, invoke a weaker compression upon the resolution of the high illumination intensity levels by one notch.
(9) If 100<NB<=120, invoke a weaker compression upon the resolution of the high illumination intensity levels by two notches.
(10) If 80<NB<=100, invoke a weaker compression upon the resolution of the high illumination intensity levels by three notches.
(11) If 60<NB<=80, invoke a weaker compression upon the resolution of the high illumination intensity levels by four notches.
(12) If 400<NB<=60, invoke a weaker compression upon the resolution of the high illumination intensity levels by five notches.
(13) If 20<NB<=40, invoke a weaker compression upon the resolution of the high illumination intensity levels by six notches.
(14) If 20>NB, invoke a weaker compression upon the resolution of the high illumination intensity levels by seven notches.

These rules enable selection of an illumination intensity level mapping function that proportions the intensity levels of the pixels in the manner described earlier.

In one embodiment of the present invention, a number of pixels of image data having illumination intensity levels within a first defined range of illumination intensity levels is determined. From this determined number of pixels, an illumination intensity level mapping function is determined that is used to create a transfer control function that can then be imposed upon a pixel of the digital imager. A number of pixels having illumination intensity levels within a second defined range of illumination intensity levels is determined to enabling the determination of an integration time. If the integration function is determined, the determination of the transfer control function is based on the determined illumination intensity level mapping function and the determined integration time.

The determination of an illumination intensity level mapping function and integration time is repeated until a desired dynamic range is realized. The first defined range of illumination intensity levels is a range of illumination intensity levels including an illumination intensity level representing pixel saturation, and the second defined range of illumination intensity levels is a range of illumination intensity levels including an illumination intensity level representing a minimum illumination intensity level, wherein the minimum illumination intensity level can be adjusted for a pixel offset, residual pixel charge.

The determination of a number of pixels of image data having illumination intensity levels within a first defined range of illumination intensity levels can be from a frame of pixels of image data created by the digital imager, from a partial frame of pixels of image data created by the digital imager, from a defined area within a frame of pixels of image data created by the digital imager, or from a user-defined area within a frame of pixels of image data created by the digital imager.

The illumination intensity level mapping function can be either calculated or selected from a plurality of pre-specified illumination intensity level mapping functions, preferably from eight pre-specified illumination intensity level mapping functions, based upon the determined number of pixels within the first defined range of illumination intensity levels. Moreover, the transfer control function can be either calculated or selected from a plurality of pre-specified transfer control functions based upon the determined illumination intensity level mapping function and determined integration time.

Furthermore, the determination of the transfer control function can realized during the generation of a second frame of image data that is immediate subsequent to the frame of image data being used to make the determination. In this situation, the new transfer control function is imposed upon pixels during the generation of a third frame of image data, the third frame being immediate subsequent to the second frame of image data.

On the other hand, if the determination is being made on only a partial frame, the determination of the transfer control function can realized during the generation of a first frame of image data which is the frame of image data having the partial frame of image. In this situation, the new transfer control function is imposed upon pixels during the generation of a second frame of image data, the second frame being immediate subsequent to the first frame of image data.

The illumination intensity level mapping function may be determined independent of, dependent upon, after, before, or substantially simultaneous with the determination of the integration time. Moreover, the illumination intensity level mapping function may be a composite function comprising individual discrete functions wherein each individual discrete illumination intensity level mapping function is determined based upon the determination of a number of pixels within a defined range of illumination intensity levels. Each individual illumination intensity level mapping function is associated with a defined range of illumination intensity levels.

In another embodiment of the present invention, a number of saturated pixels is determined and a first illumination intensity level mapping function is selected when the determined number of saturated pixels is above a first threshold. This embodiment also determines a number of pixels having illumination intensity levels within a defined range of levels and selects a second illumination intensity level mapping function when the determined number of pixels is below a second threshold. The transfer control function is determined based on the selected illumination intensity level mapping function and imposed upon a pixel of the digital imager.

In a third embodiment, the present invention determines a number of pixels of image data having illumination intensity levels within a first defined range of illumination intensity levels, the first defined range of illumination intensity levels including an illumination intensity level corresponding to a pixel saturation value and determines an illumination intensity level mapping function based thereupon. An integration time is determined based upon a number of pixels having illumination intensity levels within a second defined range of illumination intensity levels, the second defined range of illumination intensity levels including an illumination intensity level corresponding to a minimum illumination intensity level. A transfer control function is created based upon the determined illumination intensity level mapping function and the determined integration time and imposed upon a pixel of the digital imager.

The transfer control function comprises a plurality of discrete transfer control functions, preferably eight discrete transfer control functions.

In a further embodiment, the present invention selects a first illumination intensity level mapping function and determines a first transfer control function based on the selected first illumination intensity level mapping function. The determined transfer control function is imposed upon a pixel of the digital imager. Thereafter, a histogram of illumination intensity levels of pixels of image data being generated by the digital imager having the determined first transfer control function imposed thereon is determined and an illumination intensity level maximum is determined, the illumination intensity level maximum representing a greatest illumination intensity level for a pixel in a sample forming the histogram. A second illumination intensity level mapping function is determined based on the determined intensity level maximum. The second illumination intensity level mapping function prevents the generation of any saturated pixels and provides a dynamic range of image data enabling each level in the histogram to be realized by the digital imager. A second transfer control function is determined based on the second illumination intensity level mapping function and imposed upon a pixel of the digital imager. The first illumination intensity level mapping function is a maximum compression of the resolution of the high illumination intensity levels of the imaged scene.

The present invention contemplates additional techniques for adaptively controlling the sensitivity, on a pixel-by-pixel basis, of a digital camera. For example, the integration time control techniques described above can be replaced or combined with any suitable mechanical iris control and/or intensity signal gain control. Mechanical iris control and intensity signal gain control can be employed to produce results similar to the integration control, but these controls produce some side effects also. If the mechanical iris is increased, for example, the depth of focus will be correspondingly decreased. If the signal gain is increased, as another example, the noise level, as well as the signal level will be correspondingly increased.

The description provided above and accompanying diagrams are provided to demonstrate the broad scope of the adaptive sensitivity control contemplated by the invention. No particular implementation of the techniques of the invention is required; rather, any implementation that enables compression rate and integration time control of a digital imager to enable imager sensitivity control is contemplated by the invention.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:
1. A method of adaptively controlling sensitivity, on a pixel-by-pixel basis, of a digital imager, comprising:
   (a) determining a number of pixels of image data having illumination intensity levels within a first defined range of illumination intensity levels;

(b) determining an illumination intensity level mapping function based upon the determined number of pixels within the first defined range of illumination intensity levels;

(c) determining a transfer control function based on the determined illumination intensity level mapping function;

(d) imposing the determined transfer control function upon a pixel of the digital imager;

(e) determining a number of pixels having illumination intensity levels within a second defined range of illumination intensity levels; and determining an integration time based upon the determined number of pixels having illumination intensity levels within a second defined range of illumination intensity levels;

said determination of the transfer control function being determined based on the determined illumination intensity level mapping function and the determined integration time.

2. The method as claimed in claim 1, wherein (a)-(d) are repeated until a desired dynamic range is realized.

3. The method as claimed in claim 1, wherein the first defined range of illumination intensity levels is a range of illumination intensity levels including an illumination intensity level representing pixel saturation.

4. The method as claimed in claim 1, wherein the second defined range of illumination intensity levels is a range of illumination intensity levels including an illumination intensity level representing a minimum illumination intensity level.

5. The method as claimed in claim 1, wherein the first defined range of illumination intensity levels is a range of illumination intensity levels including an illumination intensity level representing pixel saturation and the second defined range of illumination intensity levels is a range of illumination intensity levels including an illumination intensity level representing a minimum illumination intensity level adjusted for a pixel offset value.

6. The method as claimed in claim 1, wherein said determination of a number of pixels of image data having illumination intensity levels within a first defined range of illumination intensity levels determines a number of pixels of image data having illumination intensity levels within a first defined range of illumination intensity levels from a frame of pixels of image data created by the digital imager.

7. The method as claimed in claim 1, wherein said determination of a number of pixels of image data having illumination intensity levels within a first defined range of illumination intensity levels determines a number of pixels of image data having illumination intensity levels within a first defined range of illumination intensity levels from a partial frame of pixels of image data created by the digital imager.

8. The method as claimed in claim 1, wherein said determination of a number of pixels of image data having illumination intensity levels within a first defined range of illumination intensity levels determines a number of pixels of image data having illumination intensity levels within a first defined range of illumination intensity levels from a defined area within a frame of pixels of image data created by the digital imager.

9. The method as claimed in claim 1, wherein said determination of a number of pixels of image data having illumination intensity levels within a first defined range of illumination intensity levels determines a number of pixels of image data having illumination intensity levels within a first defined range of illumination intensity levels from a user-defined area within a frame of pixels of image data created by the digital imager.

10. The method as claimed in claim 1, wherein the determined illumination intensity level mapping function is a calculated illumination intensity level mapping function, the calculation being based upon the determined number of pixels within the first defined range of illumination intensity levels.

11. The method as claimed in claim 1, wherein the determined illumination intensity level mapping function is a selected illumination intensity level mapping function selected from a plurality of pre-specified illumination intensity level mapping functions, the selection being based upon the determined number of pixels within the first defined range of illumination intensity levels.

12. The method as claimed in claim 1, wherein the determined transfer control function is a calculated transfer control function, the calculation being based upon the determined illumination intensity level mapping function.

13. The method as claimed in claim 1, wherein the determined transfer control function is a selected transfer control function from a plurality of pre-specified transfer control functions, the selection being based upon the determined illumination intensity level mapping function.

14. The method as claimed in claim 1, wherein the determined transfer control function is a calculated transfer control function, the calculation being based upon the determined illumination intensity level mapping function and determined integration time.

15. The method as claimed in claim 1, wherein the determined transfer control function is a selected transfer control function from a plurality of pre-specified transfer control functions, the selection being based upon the determined illumination intensity level mapping function and determined integration time.

16. The method as claimed in claim 1, wherein the illumination intensity level mapping function is determined independently of the determination of the integration time.

17. The method as claimed in claim 1, wherein the determinations of the illumination intensity level mapping function and integration time are dependent thereupon.

18. The method as claimed in claim 1, wherein the illumination intensity level mapping function is determined prior to the determination of the integration time.

19. The method as claimed in claim 1, wherein the illumination intensity level mapping function is determined after the determination of the integration time.

20. The method as claimed in claim 1, wherein determinations of the illumination intensity level mapping function and the integration time are determined substantially simultaneously.

21. The method as claimed in claim 11, wherein the number of illumination intensity level mapping functions to select from is eight.

22. The method as claimed in claim 1, further comprising:
(d) determining, for each of a plurality of defined ranges of illumination intensity levels, a number of pixels within the defined range of illumination intensity levels when the determined number of pixels within the first defined range of illumination intensity levels is above a first threshold; and
(e) determining, for each defined range of illumination intensity levels, an illumination intensity level mapping function based upon the determined number of pixels within the defined ranges of illumination intensity levels.

23. A method of adaptively controlling sensitivity, on a pixel-by-pixel basis, of a digital imager, comprising:
(a) determining a number of pixels of image data having illumination intensity levels within a first defined range of illumination intensity levels;
(b) determining an illumination intensity level mapping function based upon the determined number of pixels within the first defined range of illumination intensity levels;
(c) determining a transfer control function based on the determined illumination intensity level mapping function; and
(d) imposing the determined transfer control function upon a pixel of the digital imager;
said determination of a number of pixels of image data having illumination intensity levels within a first defined range of illumination intensity levels determines a number of pixels of image data having illumination intensity levels within a first defined range of illumination intensity levels during a period of time that the digital imager is creating a second frame of pixels;
said determination of an illumination intensity level mapping function determines an illumination intensity level mapping function based upon the determined number of pixels of image data having illumination intensity levels within a first defined range of illumination intensity levels during the period of time that the digital imager is creating the second frame of pixels; and
said imposition of the determined transfer control function imposes the determined transfer control function upon a pixel of the digital imager during a third frame of pixels of image data being created by the digital imager.

24. A method of adaptively controlling sensitivity, on a pixel-by-pixel basis, of a digital imager, comprising:
(a) determining a number of pixels of image data having illumination intensity levels within a first defined range of illumination intensity levels;
(b) determining an illumination intensity level mapping function based upon the determined number of pixels within the first defined range of illumination intensity levels;
(c) determining a transfer control function based on the determined illumination intensity level mapping function; and
(d) imposing the determined transfer control function upon a pixel of the digital imager;
said determination of a number of pixels of image data having illumination intensity levels within a first defined range of illumination intensity levels determines a number of pixels of image data having illumination intensity levels within a first defined range of illumination intensity levels during a period of time that the digital imager is creating a first frame of pixels;
said determination of an illumination intensity level mapping function determines an illumination intensity level mapping function based upon the determined number of pixels of image data having intensity levels within a first defined range of intensity levels during the period of time that the digital imager is creating the first frame of pixels; and
said imposition of the determined transfer control function imposes the determined transfer control function upon a pixel of the digital imager during a second frame of pixels of image data being created by the digital imager.

25. A method of adaptively controlling sensitivity, on a pixel-by-pixel basis, of a digital imager, comprising:
(a) determining a plurality of numbers of pixels, each determined number of pixels being a number of pixels within an associated defined range of illumination intensity levels;
(b) determining a plurality of illumination intensity level mapping functions, each determined illumination intensity level mapping function corresponding to one defined range of illumination intensity levels, each illumination intensity level mapping function being determined based upon the determined number of pixels within an associated defined range of illumination intensity levels;
(c) determining a transfer control function based on the plurality of determined illumination intensity level mapping functions;
(d) imposing the determined transfer control function upon a pixel of the digital imager;
(e) determining a number of pixels having illumination intensity levels within a specified range of illumination intensity levels; and
(f) determining an integration time based upon the determined number of pixels having illumination intensity levels within a specified range of illumination intensity levels;
said determination of the transfer control function being determined based on the plurality of determined illumination intensity level mapping functions and the determined integration time.

26. The method as claimed in claim 25, wherein (a)-(d) are repeated until a desired dynamic range is realized.

27. The method as claimed in claim 25, wherein the specified range of illumination intensity levels is a range of illumination intensity levels including an illumination intensity level representing a minimum illumination intensity level.

28. The method as claimed in claim 25, wherein the specified range of illumination intensity levels is a range of illumination intensity levels including an illumination intensity level representing a minimum illumination intensity level adjusted for a pixel offset value.

29. The method as claimed in claim 25, wherein said determination of a plurality of numbers of pixels determines each number of pixels corresponding to one defined range of illumination intensity levels from a frame of pixels of image data created by the digital imager.

30. The method as claimed in claim 25, wherein said determination of a plurality of numbers of pixels determines each number of pixels corresponding to one defined range of illumination intensity levels from a partial frame of pixels of image data created by the digital imager.

31. The method as claimed in claim 25, wherein said determination of a plurality of numbers of pixels determines each number of pixels corresponding to one defined range of illumination intensity levels from a defined area within a frame of pixels of image data created by the digital imager.

32. The method as claimed in claim 25, wherein said determination of a plurality of numbers of pixels determines each number of pixels corresponding to one defined range of illumination intensity levels from a user-defined area within a frame of pixels of image data created by the digital imager.

33. A method of adaptively controlling sensitivity, on a pixel-by-pixel basis, of a digital imager, comprising:
(a) determining a plurality of numbers of pixels, each determined number of pixels being a number of pixels within an associated defined range of illumination intensity levels;

(b) determining a plurality of illumination intensity level mapping functions, each determined illumination intensity level mapping function corresponding to one defined range of illumination intensity levels, each illumination intensity level mapping function being determined based upon the determined number of pixels within an associated defined range of illumination intensity levels;

(c) determining a transfer control function based on the plurality of determined illumination intensity level mapping functions; and (d) imposing the determined transfer control function upon a pixel of the digital imager;

said determination of a plurality of numbers of pixels determines each number of pixels corresponding to one defined range of illumination intensity levels during a period of time that the digital imager is creating a second frame of pixels;

said determination of a plurality of illumination intensity level mapping function determining each illumination intensity level mapping function corresponding to one of the defined ranges of illumination intensity levels during the period of time that the digital imager is creating the second frame of pixels; and said imposition of the determined transfer control function imposes the determined transfer control function upon a pixel of the digital imager during a third frame of pixels of image data created by the digital imager.

34. A method of adaptively controlling sensitivity, on a pixel-by-pixel basis, of a digital imager, comprising:

(a) determining a plurality of numbers of pixels, each determined number of pixels being a number of pixels within an associated defined range of illumination intensity levels;

(b) determining a plurality of illumination intensity level mapping functions, each determined illumination intensity level mapping function corresponding to one defined range of illumination intensity levels, each illumination intensity level mapping function being determined based upon the determined number of pixels within an associated defined range of illumination intensity levels;

(c) determining a transfer control function based on the plurality of determined illumination intensity level mapping functions; and (d) imposing the determined transfer control function upon a pixel of the digital imager;

said determination of a plurality of numbers of pixels determines each number of pixels corresponding to one defined range of illumination intensity levels during a period of time that the digital imager is creating a first frame of pixels;

said determination of a plurality of illumination intensity level mapping function determining each illumination intensity level mapping function corresponding to one of the defined ranges of illumination intensity levels during the period of time that the digital imager is creating the first frame of pixels; and said imposition of the determined transfer control function imposes the determined transfer control function upon a pixel of the digital imager during a second frame of pixels of image data created by the digital imager.

35. A method of adaptively controlling sensitivity, on a pixel-by-pixel basis, of a digital imager, comprising:

(a) determining a number of saturated pixels;

(b) selecting a first illumination intensity level mapping function when the determined number of saturated pixels is above a first threshold;

(c) determining a number of pixels having illumination intensity levels within a defined range of values;

(d) selecting a second illumination intensity level mapping function when the determined number of pixels is below a second threshold;

(e) determining a transfer control function based on the selected illumination intensity level mapping function; and (f) imposing the determined transfer control function upon a pixel of the digital imager.

36. The method as claimed in claim 35, wherein the first illumination intensity level mapping function represents a greater compression of the resolution of the high illumination intensity levels of the scene than the second illumination intensity level mapping function.

37. The method as claimed in claim 35, wherein said determination of the number of pixels having illumination intensity levels within a defined range of values determines the number of pixels when the determined number of saturated pixels is below a first threshold.

38. The method as claimed in claim 35, further comprising:

(g) determining a number of pixels having illumination intensity levels within a specified range of illumination intensity levels; and (h) determining an integration time based upon the determined number of pixels having illumination intensity levels within a specified range of illumination intensity levels;

said determination of the transfer control function being determined based on the selected illumination intensity level mapping function and the determined integration time.

39. A method of adaptively controlling sensitivity, on a pixel-by-pixel basis, of a digital imager, comprising:

(a) determining a number of pixels of image data having illumination intensity levels within a first defined range of illumination intensity levels, the first defined range of illumination intensity levels including an illumination intensity level corresponding to a pixel saturation value;

(b) determining an illumination intensity level mapping function based upon the determined number of pixels within the first defined range of illumination intensity levels;

(c) determining a number of pixels having illumination intensity levels within a second defined range of illumination intensity levels, the second defined range of illumination intensity levels including an illumination intensity level corresponding to a minimum illumination intensity level;

(d) determining an integration time based upon the determined number of pixels having illumination intensity levels within the second defined range of illumination intensity levels;

(e) determining a transfer control function based on the determined illumination intensity level mapping function and the determined integration time; and (f) imposing the determined transfer control function upon a pixel of the digital imager.

40. The method as claimed in claim 39, wherein the transfer control function comprises a plurality of discrete transfer control functions.

41. The method as claimed in claim 39, wherein the transfer control function comprises eight discrete transfer control functions.

42. The method as claimed in claim 41, wherein the determined illumination intensity level mapping function comprises a plurality of discrete illumination intensity level mapping functions.

43. The method as claimed in claim 41, wherein the determined illumination intensity level mapping function comprises eight discrete illumination intensity level mapping functions.

44. The method as claimed in claim 42, wherein each discrete transfer control function is determined based on one of the plurality of distinct illumination intensity level mapping functions.

45. The method as claimed in claim 43, wherein each discrete transfer control function is determined based on one of the eight distinct illumination intensity level mapping functions.

46. The method as claimed in claim 42, wherein each discrete illumination intensity level mapping function is a linear illumination intensity level mapping function.

47. The method as claimed in claim 43, wherein each discrete illumination intensity level mapping function is a linear illumination intensity level mapping function.

48. The method as claimed in claim 46, wherein the plurality of discrete linear illumination intensity level mapping functions form a composite piece-wise linear illumination intensity level mapping function, the composite piece-wise linear compression being the determined illumination intensity level mapping function, the determined illumination intensity level mapping function being a nearly logarithmic illumination intensity level mapping function.

49. The method as claimed in claim 47, wherein the eight discrete linear illumination intensity level mapping functions form a composite piece-wise linear illumination intensity level mapping function, the composite piece-wise linear compression being the determined illumination intensity level mapping function, the determined illumination intensity level mapping function being a nearly logarithmic illumination intensity level mapping function.

50. A method of adaptively controlling sensitivity, on a pixel-by-pixel basis, of a digital imager, comprising:
(a) selecting a first illumination intensity level mapping function;
(b) determining a first transfer control function based on the selected first compression;
(c) imposing the determined first transfer control function upon a pixel of the digital imager;
(d) determining a histogram of illumination intensity levels of pixels of image data being generated by the digital imager having the determined first transfer control function imposed thereon;
(e) determining an illumination intensity level maximum, the illumination intensity level maximum representing a greatest illumination intensity level for a pixel in a sample forming the histogram;
(f) determining a second illumination intensity level mapping function, based on the determined intensity level maximum, the second illumination intensity level mapping function preventing the generation of any saturated pixels and providing a dynamic range of image data enabling each level in the histogram to be realized by the digital imager;
(g) determining a second transfer control function based on the determined second illumination intensity level mapping function; and
(h) imposing the determined second transfer control function upon a pixel of the digital imager.

51. The method as claimed in claim 50, wherein the first illumination intensity level mapping function represents a greater compression of the resolution of the high illumination intensity levels of the scene than the second illumination intensity level mapping function.

52. A system for adaptively controlling sensitivity, on a pixel-by-pixel basis, of a digital imager, comprising:
an illumination intensity level mapping controller, operatively connected to the digital imager, to determine a number of pixels of image data having illumination intensity levels within a first defined range of illumination intensity levels and to determine an illumination intensity level mapping function based upon the determined number of pixels within the first defined range of illumination intensity levels;
a transfer control function generation circuit, operatively connected to the digital imager and said illumination intensity level mapping controller, to determine a transfer control function based on the determined illumination intensity level mapping function and to impose the determined transfer control function upon a pixel of the digital imager; and
an exposure controller, operatively connected to the digital imager and said transfer control function generation circuit, to determine a number of pixels having illumination intensity levels within a second defined range of illumination intensity levels and to determine an integration time based upon the determined number of pixels having illumination intensity levels within a second defined range of illumination intensity levels;
said transfer control function generation circuit determining said transfer control function based on the determined illumination intensity level mapping function and the determined integration time.

53. The system as claimed in claim 52, wherein the first defined range of illumination intensity levels is a range of illumination intensity levels including an illumination intensity level representing pixel saturation.

54. The system as claimed in claim 52, wherein the second defined range of illumination intensity levels is a range of illumination intensity levels including an illumination intensity level representing a minimum illumination intensity level.

55. The system as claimed in claim 52, wherein the first defined range of illumination intensity levels is a range of illumination intensity levels including an illumination intensity level representing pixel saturation and the second defined range of illumination intensity levels is a range of illumination intensity levels including an illumination intensity level representing a minimum illumination intensity level adjusted for a pixel offset value.

56. The system as claimed in claim 52, wherein said illumination intensity level mapping controller determines a number of pixels of image data having illumination intensity levels within a first defined range of illumination intensity levels from a frame of pixels of image data created by the digital imager.

57. The system as claimed in claim 52, wherein said illumination intensity level mapping controller determines a number of pixels of image data having illumination intensity levels within a first defined range of illumination intensity levels from a partial frame of pixels of image data created by the digital imager.

58. The system as claimed in claim 50, wherein said illumination intensity level mapping controller determines a number of pixels of image data having illumination intensity levels within a first defined range of illumination intensity levels from a defined area within a frame of pixels of image data created by the digital imager.

59. The system as claimed in claim 52, wherein said illumination intensity level mapping controller determines a number of pixels of image data having illumination intensity levels within a first defined range of illumination intensity levels from a user-defined area within a frame of pixels of image data created by the digital imager.

60. The system as claimed in claim 52, wherein the determined illumination intensity level mapping function is a calculated illumination intensity level mapping function, the calculation being based upon the determined number of pixels within the first defined range of illumination intensity levels.

61. The system as claimed in claim 52, wherein the determined illumination intensity level mapping function is a selected illumination intensity level mapping function selected from a plurality of pre-specified illumination intensity level mapping functions, the selection being based upon the determined number of pixels within the first defined range of illumination intensity levels.

62. The system as claimed in claim 52, wherein the determined transfer control function is a calculated transfer control function, the calculation being based upon the determined illumination intensity level mapping function.

63. The system as claimed in claim 52, wherein the determined transfer control function is a selected transfer control function from a plurality of pre-specified transfer control functions, the selection being based upon the determined illumination intensity level mapping function.

64. The system as claimed in claim 52, wherein the determined transfer control function is a calculated transfer control function, the calculation being based upon the determined illumination intensity level mapping function and determined integration time.

65. The system as claimed in claim 52, wherein the determined transfer control function is a selected transfer control function from a plurality of pre-specified transfer control functions, the selection being based upon the determined illumination intensity level mapping function and determined integration time.

66. The system as claimed in claim 52, wherein the illumination intensity level mapping function is determined independently of the determination of the integration time.

67. The system as claimed in claim 52, wherein the determinations of the illumination intensity level mapping function and integration time are dependent thereupon.

68. The system as claimed in claim 52, wherein the illumination intensity level mapping function is determined prior to the determination of the integration time.

69. The system as claimed in claim 52, wherein the illumination intensity level mapping function is determined after the determination of the integration time.

70. The system as claimed in claim 52, wherein determinations of the illumination intensity level mapping function and the integration time are determined substantially simultaneously.

71. The system as claimed in claim 52, wherein said illumination intensity level mapping controller determines, for each of a plurality of defined ranges of illumination intensity levels, a number of pixels within the defined range of illumination intensity levels when the determined number of pixels within the first defined range of illumination intensity levels is above a first threshold;

said illumination intensity level mapping controller determines, for each defined range of illumination intensity levels, an illumination intensity level mapping function based upon the determined number of pixels within the defined ranges of illumination intensity levels.

72. A system for adaptively controlling sensitivity, on a pixel-by-pixel basis, of a digital imager, comprising:

an illumination intensity level mapping controller, operatively connected to the digital imager, to determine a number of pixels of image data having illumination intensity levels within a first defined range of illumination intensity levels and to determine an illumination intensity level mapping function based upon the determined number of pixels within the first defined range of illumination intensity levels; and a transfer control function generation circuit, operatively connected to the digital imager and said illumination intensity level mapping controller, to determine a transfer control function based on the determined illumination intensity level mapping function and to impose the determined transfer control function upon a pixel of the digital imager;

said illumination intensity level mapping controller determines a number of pixels of image data having illumination intensity levels within a first defined range of illumination intensity levels during a period of time that the digital imager is creating a second frame of pixels;

said illumination intensity level mapping controller determines the illumination intensity level mapping function based upon the determined number of pixels of image data having illumination intensity levels within a first defined range of illumination intensity levels during the period of time that the digital imager is creating the second frame of pixels; and said transfer control function generation circuit imposes the determined transfer control function upon a pixel of the digital imager during a third frame of pixels of image data being created by the digital imager.

73. A system for adaptively controlling sensitivity, on a pixel-by-pixel basis, of a digital imager, comprising:

an illumination intensity level mapping controller, operatively connected to the digital imager, to determine a number of pixels of image data having illumination intensity levels within a first defined range of illumination intensity levels and to determine an illumination intensity level mapping function based upon the determined number of pixels within the first defined range of illumination intensity levels; and a transfer control function generation circuit, operatively connected to the digital imager and said illumination intensity level mapping controller, to determine a transfer control function based on the determined illumination intensity level mapping function and to impose the determined transfer control function upon a pixel of the digital imager;

said illumination intensity level mapping controller determines a number of pixels of image data having illumination intensity levels within a first defined range of illumination intensity levels during a period of time that the digital imager is creating a first frame of pixels;

said illumination intensity level mapping controller determines the illumination intensity level mapping function based upon the determined number of pixels of image data having intensity levels within a first defined range of intensity levels during the period of time that the digital imager is creating the first frame of pixels; and said transfer control function generation circuit imposes the determined transfer control function upon a pixel of the digital imager during a second frame of pixels of image data being created by the digital imager.

74. A system for adaptively controlling sensitivity, on a pixel-by-pixel basis, of a digital imager, comprising:
an illumination intensity level mapping controller, operatively connected to the digital imager, to determine a plurality of number of pixels, each determined number of pixels being a number of pixels within an associated defined range of illumination intensity levels and to determine a plurality of illumination intensity level mapping functions, each determined illumination intensity level mapping function corresponding to one defined range of illumination intensity levels, each illumination intensity level mapping function being determined based upon the determined number of pixels within an associated defined range of illumination intensity levels;
a transfer control function generation circuit, operatively connected to the digital imager and said illumination intensity level mapping controller, to determine a transfer control function based on the plurality of determined illumination intensity level mapping functions and to impose the determined transfer control function upon a pixel of the digital imager; and
an exposure controller, operatively connected to the digital imager and said transfer control function generation circuit, to determine a number of pixels having illumination intensity levels within a specified range of illumination intensity levels and to determine an integration time based upon the determined number of pixels having illumination intensity levels within a specified range of illumination intensity levels;
said transfer control function generation circuit determining said transfer control function based on the plurality of determined illumination intensity level mapping functions and the determined integration time.

75. The system as claimed in claim 74, wherein the specified range of illumination intensity levels is a range of illumination intensity levels including an illumination intensity level representing a minimum illumination intensity level.

76. The system as claimed in claim 74, wherein the specified range of illumination intensity levels is a range of illumination intensity levels including an illumination intensity level representing a minimum illumination intensity level adjusted for a pixel offset value.

77. The system as claimed in claim 74, wherein said illumination intensity level mapping controller determines each number of pixels corresponding to one defined range of illumination intensity levels from a frame of pixels of image data created by the digital imager.

78. The system as claimed in claim 74, wherein said illumination intensity level mapping controller determines each number of pixels corresponding to one defined range of illumination intensity levels from a partial frame of pixels of image data created by the digital imager.

79. The system as claimed in claim 74, wherein said illumination intensity level mapping controller determines each number of pixels corresponding to one defined range of illumination intensity levels from a defined area within a frame of pixels of image data created by the digital imager.

80. The system as claimed in claim 74, wherein said illumination intensity level mapping controller determines each number of pixels corresponding to one defined range of illumination intensity levels from a user-defined area within a frame of pixels of image data created by the digital imager.

81. A system for adaptively controlling sensitivity, on a pixel-by-pixel basis, of a digital imager, comprising:
an illumination intensity level mapping controller, operatively connected to the digital imager, to determine a plurality of number of pixels, each determined number of pixels being a number of pixels within an associated defined range of illumination intensity levels and to determine a plurality of illumination intensity level mapping functions, each determined illumination intensity level mapping function corresponding to one defined range of illumination intensity levels, each illumination intensity level mapping function being determined based upon the determined number of pixels within an associated defined range of illumination intensity levels; and
a transfer control function generation circuit, operatively connected to the digital imager and said illumination intensity level mapping controller, to determine a transfer control function based on the plurality of determined illumination intensity level mapping functions and to impose the determined transfer control function upon a pixel of the digital imager;
said illumination intensity level mapping controller determines each number of pixels corresponding to one defined range of illumination intensity levels during a period of time that the digital imager is creating a second frame of pixels;
said illumination intensity level mapping controller determines each illumination intensity level mapping function corresponding to one of the defined ranges of illumination intensity levels during the period of time that the digital imager is creating the second frame of pixels; and
said transfer control function generation circuit imposes the determined transfer control function upon a pixel of the digital imager during a third frame of pixels of image data created by the digital imager.

82. A system for adaptively controlling sensitivity, on a pixel-by-pixel basis, of a digital imager, comprising:
an illumination intensity level mapping controller, operatively connected to the digital imager, to determine a plurality of number of pixels, each determined number of pixels being a number of pixels within an associated defined range of illumination intensity levels and to determine a plurality of illumination intensity level mapping functions, each determined illumination intensity level mapping function corresponding to one defined range of illumination intensity levels, each illumination intensity level mapping function being determined based upon the determined number of pixels within an associated defined range of illumination intensity levels; and
a transfer control function generation circuit, operatively connected to the digital imager and said illumination intensity level mapping controller, to determine a transfer control function based on the plurality of determined illumination intensity level mapping functions and to impose the determined transfer control function upon a pixel of the digital imager;
said illumination intensity level mapping controller determines each number of pixels corresponding to one defined range of illumination intensity levels during a period of time that the digital imager is creating a first frame of pixels;
said illumination intensity level mapping controller determines each illumination intensity level mapping function corresponding to one of the defined ranges of illumination intensity levels during the period of time that the digital imager is creating the first frame of pixels; and said transfer control function generation circuit imposes the determined transfer control function upon a pixel of the digital imager during a second frame of pixels of image data created by the digital imager.

83. A system for adaptively controlling sensitivity, on a pixel-by-pixel basis, of a digital imager, comprising:
   an illumination intensity level mapping controller, operatively connected to the digital imager, to determine a number of saturated pixels and to select a first illumination intensity level mapping function when the determined number of saturated pixels is above a first threshold;
   said illumination intensity level mapping controller determining an number of pixels having illumination intensity levels within a defined range of values and selecting a second illumination intensity level mapping function when the determined number of pixels is below a second threshold; and
   a transfer control function generation circuit, operatively connected to the digital imager and said illumination intensity level mapping controller, to determine a transfer control function based on the selected illumination intensity level mapping function and to impose the determined transfer control function upon a pixel of the digital imager.

84. The system as claimed in claim 83, wherein the first illumination intensity level mapping function represents a greater compression of the resolution of the high illumination intensity levels of the scene than the second illumination intensity level mapping function.

85. The system as claimed in claim 83, wherein said illumination intensity level mapping controller determines the number of pixels when the determined number of saturated pixels is below a first threshold.

86. The system as claimed in claim 83, further comprising:
   an exposure controller, operatively connected to the digital imager and said transfer control function generation circuit, to determine a number of pixels having illumination intensity levels within a specified range of illumination intensity levels and to determine an integration time based upon the determined number of pixels having illumination intensity levels within a specified range of illumination intensity levels;
   said transfer control function generation circuit determining the transfer control function based on the selected illumination intensity level mapping function and the determined integration time.

87. A system for adaptively controlling sensitivity, on a pixel-by-pixel basis, of a digital imager, comprising:
   an illumination intensity level mapping controller, operatively connected to the digital imager, to determine a number of pixels of image data having illumination intensity levels within a first defined range of illumination intensity levels, the first defined range of illumination intensity levels including an illumination intensity level corresponding to a pixel saturation value, and to determine an illumination intensity level mapping function based upon the determined number of pixels within the first defined range of illumination intensity levels;
   an exposure controller, operatively connected to the digital imager, to determine a number of pixels having illumination intensity levels within a second defined range of illumination intensity levels, the second defined range of illumination intensity levels including an illumination intensity level corresponding to a minimum illumination intensity level, and to determine an integration time based upon the determined number of pixels having illumination intensity levels within the second defined range of illumination intensity levels; and
   a transfer control function generation circuit, operatively connected to the digital imager, said exposure controller and said illumination intensity level mapping controller, to determine a transfer control function based on the determined illumination intensity level mapping function and the determined integration time and to impose the determined transfer control function upon a pixel of the digital imager.

88. The system as claimed in claim 87, wherein the transfer control function comprises a plurality of discrete transfer control functions.

89. The system as claimed in claim 87, wherein the transfer control function comprises eight discrete transfer control functions.

90. The system as claimed in claim 88, wherein the determined illumination intensity level mapping function comprises a plurality of discrete illumination intensity level mapping functions.

91. The system as claimed in claim 89, wherein the determined illumination intensity level mapping function comprises eight discrete illumination intensity level mapping functions.

92. The system as claimed in claim 90, wherein each discrete transfer control function is determined based on one of the plurality of distinct illumination intensity level mapping functions.

93. The system as claimed in claim 91, wherein each discrete transfer control function is determined based on one of the eight distinct illumination intensity level mapping functions.

94. The system as claimed in claim 90, wherein each discrete illumination intensity level mapping function is a linear illumination intensity level mapping function.

95. The system as claimed in claim 91, wherein each discrete illumination intensity level mapping function is a linear illumination intensity level mapping function.

96. The system as claimed in claim 94, wherein the plurality of discrete linear illumination intensity level mapping functions form a composite piece-wise linear illumination intensity level mapping function, the composite piece-wise linear compression being the determined illumination intensity level mapping function, the determined illumination intensity level mapping function being a nearly logarithmic illumination intensity level mapping function.

97. The system as claimed in claim 95, wherein the eight discrete linear illumination intensity level mapping functions form a composite piece-wise linear illumination intensity level mapping function, the composite piece-wise linear compression being the determined illumination intensity level mapping function, the determined illumination intensity level mapping function being a nearly logarithmic illumination intensity level mapping function.

98. A system for adaptively controlling sensitivity, on a pixel-by-pixel basis, of a digital imager, comprising:
   an illumination intensity level mapping controller, operatively connected to the digital imager, to select a first illumination intensity level mapping function; and
   a transfer control function generation circuit, operatively connected to the digital imager and said illumination intensity level mapping controller, to determine a first transfer control function based on the selected first compression and to impose the determined first transfer control function upon a pixel of the digital imager;

said illumination intensity level mapping controller determining a histogram of illumination intensity levels of pixels of image data being generated by the digital imager having the determined first transfer control function imposed thereon;

said illumination intensity level mapping controller determining an illumination intensity level maximum, the illumination intensity level maximum representing a greatest illumination intensity level for a pixel in a sample forming the histogram;

said illumination intensity level mapping controller determining a second illumination intensity level mapping function, based on the determined intensity level maximum, the second illumination intensity level mapping function preventing the generation of any saturated pixels and providing a dynamic range of image data enabling each level in the histogram to be realized by the digital imager;

said transfer control function generation circuit determining a second transfer control function based on the determined second illumination intensity level mapping function;

said transfer control function generation circuit imposing the second determined transfer control function upon a pixel of the digital imager.

99. The system as claimed in claim 98, wherein the first illumination intensity level mapping function represents a greater compression of the resolution of the high illumination intensity levels of the scene than the second illumination intensity level mapping function.

* * * * *